United States Patent
Stubbs et al.

(10) Patent No.: US 9,669,543 B1
(45) Date of Patent: Jun. 6, 2017

(54) VALIDATION OF ROBOTIC ITEM GRASPING

(71) Applicant: Amazon Technologies, Inc., Seattle, WA (US)

(72) Inventors: Andrew Stubbs, Waltham, MA (US); Andrew D. Marchese, Concord, MA (US); John Gregory Longtine, Sudbury, MA (US); Sarath Krishnaswamy, Dunstable, MA (US); Moses Theodore Ort, Lakewood, NJ (US); Russell Charles Toris, San Jose, CA (US); Jacob Taylor Wachlin, Arlington Heights, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/966,958

(22) Filed: Dec. 11, 2015

(51) Int. Cl.
*G05B 15/00* (2006.01)
*B25J 9/16* (2006.01)

(52) U.S. Cl.
CPC ............ *B25J 9/1612* (2013.01); *Y10S 901/32* (2013.01); *Y10S 901/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,302,138 A | * | 11/1981 | Zarudiansky | B25J 3/04 414/5 |
| 4,367,891 A | | 1/1983 | Wauer et al. | |
| 4,575,297 A | * | 3/1986 | Richter | B25J 9/0006 414/5 |
| 4,623,183 A | * | 11/1986 | Aomori | B25J 15/103 294/106 |
| 4,783,107 A | * | 11/1988 | Parker | B25J 13/082 294/213 |
| 4,921,293 A | | 5/1990 | Ruoff et al. | |
| 4,957,320 A | * | 9/1990 | Ulrich | B25J 9/102 192/56.1 |
| 4,980,626 A | | 12/1990 | Hess et al. | |
| 5,004,391 A | * | 4/1991 | Burdea | B25J 3/04 294/200 |
| 5,108,140 A | | 4/1992 | Bartholet et al. | |
| 5,172,951 A | | 12/1992 | Jacobsen et al. | |
| 5,280,265 A | * | 1/1994 | Kramer | A61B 5/6806 128/925 |

(Continued)

OTHER PUBLICATIONS

U.S. Appl. No. 14/966,912, filed Dec. 11, 2015, Titled: Feature Identification and Extrapolation for Robotic Item Grasping.

*Primary Examiner* — Jonathan L Sample
(74) *Attorney, Agent, or Firm* — Kilpatrick Townsend & Stockton

(57) ABSTRACT

A grasp management system and corresponding method are described. In some examples, it is determined whether an end of arm tool of a robotic manipulator is capable of grasping an item in a first orientation and a second orientation. Information regarding success of the attempts may be retained in a database. A richness measure for each of the first orientation and the second orientation may be determined based upon a spatial variation of successful attempted grasps in the respective orientation.

20 Claims, 13 Drawing Sheets

(56) References Cited

U.S. PATENT DOCUMENTS

| | | | | |
|---|---|---|---|---|
| 5,437,490 A * | 8/1995 | Mimura | B25J 9/102 | |
| | | | 294/106 | |
| 5,501,498 A * | 3/1996 | Ulrich | B25J 9/102 | |
| | | | 294/106 | |
| 5,548,667 A * | 8/1996 | Tu | G06T 7/70 | |
| | | | 382/115 | |
| 5,631,861 A * | 5/1997 | Kramer | G06F 3/011 | |
| | | | 414/5 | |
| 5,748,854 A * | 5/1998 | Watanabe | G05B 19/423 | |
| | | | 318/568.16 | |
| 5,762,390 A | 6/1998 | Gosselin et al. | | |
| 5,967,580 A * | 10/1999 | Rosheim | B25J 3/04 | |
| | | | 294/106 | |
| 6,016,385 A * | 1/2000 | Yee | B25J 3/04 | |
| | | | 446/327 | |
| 6,042,555 A * | 3/2000 | Kramer | A61B 5/225 | |
| | | | 600/595 | |
| 6,517,132 B2 | 2/2003 | Matsuda et al. | | |
| 6,565,563 B1 * | 5/2003 | Agee | A61H 1/0288 | |
| | | | 602/21 | |
| 6,701,296 B1 * | 3/2004 | Kramer | A61B 5/6806 | |
| | | | 370/545 | |
| 6,817,641 B1 | 11/2004 | Singleton et al. | | |
| 6,924,787 B2 * | 8/2005 | Kramer | G06F 3/03543 | |
| | | | 345/156 | |
| 7,168,748 B2 | 1/2007 | Crowell et al. | | |
| 7,340,100 B2 | 3/2008 | Higaki et al. | | |
| 7,549,688 B2 | 6/2009 | Hayakawa et al. | | |
| 7,816,128 B2 | 10/2010 | Nakashima et al. | | |
| 7,862,522 B1 * | 1/2011 | Barclay | A61B 5/6806 | |
| | | | 414/2 | |
| 7,877,165 B2 * | 1/2011 | Sugiyama | B25J 13/085 | |
| | | | 318/568.11 | |
| 8,255,079 B2 * | 8/2012 | Linn | B25J 9/0006 | |
| | | | 482/47 | |
| 8,280,837 B2 | 10/2012 | Platt et al. | | |
| 8,346,393 B2 | 1/2013 | Kim et al. | | |
| 8,350,806 B2 * | 1/2013 | Nagasaka | G06F 3/016 | |
| | | | 345/156 | |
| 8,463,434 B2 | 6/2013 | Takahashi et al. | | |
| 8,467,903 B2 * | 6/2013 | Ihrke | B25J 9/104 | |
| | | | 700/245 | |
| 8,483,880 B2 * | 7/2013 | de la Rosa Tames | B25J 9/1045 | |
| | | | 600/595 | |
| 8,504,198 B2 | 8/2013 | Takahashi et al. | | |
| 8,660,685 B2 | 2/2014 | Irie et al. | | |
| 9,122,275 B2 * | 9/2015 | Kim | G05D 3/00 | |
| 9,149,928 B2 | 10/2015 | Yamaguchi | | |
| 9,321,176 B1 * | 4/2016 | Sun | B25J 9/1612 | |
| 9,333,648 B2 * | 5/2016 | Kim | B25J 9/1612 | |
| 9,333,649 B1 | 5/2016 | Zevenbergen et al. | | |
| 9,383,895 B1 * | 7/2016 | Vinayak | G06F 3/017 | |
| 9,492,923 B2 * | 11/2016 | Wellman | B25J 9/1612 | |
| 9,545,717 B2 * | 1/2017 | Kim | B25J 9/1612 | |
| 2004/0028260 A1 | 2/2004 | Higaki et al. | | |
| 2004/0266276 A1 * | 12/2004 | Hariki | B25J 9/1697 | |
| | | | 439/894 | |
| 2005/0125099 A1 | 6/2005 | Mikami et al. | | |
| 2006/0012198 A1 | 1/2006 | Hager et al. | | |
| 2006/0128316 A1 | 6/2006 | Moller et al. | | |
| 2007/0010913 A1 | 1/2007 | Miyamoto et al. | | |
| 2007/0018470 A1 | 1/2007 | Hayakawa et al. | | |
| 2007/0078564 A1 * | 4/2007 | Hoshino | B25J 15/0009 | |
| | | | 700/245 | |
| 2007/0152619 A1 * | 7/2007 | Sugiyama | B25J 9/1612 | |
| | | | 318/568.12 | |
| 2007/0219668 A1 | 9/2007 | Takahashi et al. | | |
| 2007/0236162 A1 | 10/2007 | Kawabuchi et al. | | |
| 2007/0282485 A1 * | 12/2007 | Nagatsuka | B25J 9/1671 | |
| | | | 700/245 | |
| 2008/0077361 A1 | 3/2008 | Boyd et al. | | |
| 2008/0114491 A1 | 5/2008 | Takahashi | | |
| 2008/0204425 A1 * | 8/2008 | Nagasaka | G06F 3/016 | |
| | | | 345/173 | |
| 2008/0240889 A1 | 10/2008 | Yokoyama | B25J 9/1612 | |
| | | | 414/1 | |
| 2009/0069942 A1 | 3/2009 | Takahashi | | |
| 2009/0285664 A1 * | 11/2009 | Kim | B25J 9/1612 | |
| | | | 414/730 | |
| 2009/0302626 A1 * | 12/2009 | Dollar | B25J 9/104 | |
| | | | 294/106 | |
| 2009/0306825 A1 * | 12/2009 | Li | B25J 9/1669 | |
| | | | 700/261 | |
| 2010/0010670 A1 * | 1/2010 | Matsukuma | B25J 9/104 | |
| | | | 700/245 | |
| 2010/0011899 A1 | 1/2010 | Kim et al. | | |
| 2010/0103106 A1 * | 4/2010 | Chui | G06F 3/017 | |
| | | | 345/166 | |
| 2010/0138039 A1 * | 6/2010 | Moon | B25J 9/1612 | |
| | | | 700/245 | |
| 2010/0161130 A1 | 6/2010 | Kim et al. | | |
| 2010/0176615 A1 * | 7/2010 | Okuda | A61F 2/583 | |
| | | | 294/106 | |
| 2010/0215257 A1 * | 8/2010 | Dariush | G06K 9/00369 | |
| | | | 382/159 | |
| 2010/0280663 A1 | 11/2010 | Abdallah et al. | | |
| 2010/0292837 A1 * | 11/2010 | Takahashi | B25J 9/1612 | |
| | | | 700/245 | |
| 2011/0067521 A1 | 3/2011 | Linn et al. | | |
| 2011/0118877 A1 * | 5/2011 | Hwang | B25J 13/00 | |
| | | | 700/264 | |
| 2011/0238213 A1 * | 9/2011 | Nagasaka | B25J 9/1612 | |
| | | | 700/253 | |
| 2011/0288681 A1 * | 11/2011 | Hayakawa | B25J 15/0009 | |
| | | | 700/245 | |
| 2012/0078419 A1 * | 3/2012 | Kim | B25J 9/1669 | |
| | | | 700/255 | |
| 2012/0123589 A1 * | 5/2012 | Kim | B25J 9/1612 | |
| | | | 700/254 | |
| 2012/0153652 A1 | 6/2012 | Yamaguchi et al. | | |
| 2012/0283875 A1 | 11/2012 | Klumpp et al. | | |
| 2013/0041502 A1 * | 2/2013 | Shi | B25J 15/0009 | |
| | | | 700/245 | |
| 2013/0057004 A1 * | 3/2013 | Murata | B25J 15/0009 | |
| | | | 294/106 | |
| 2013/0173055 A1 * | 7/2013 | Kim | B25J 9/1612 | |
| | | | 700/245 | |
| 2013/0238129 A1 * | 9/2013 | Rose | F04B 9/10 | |
| | | | 700/258 | |
| 2014/0163729 A1 | 6/2014 | Shi et al. | | |
| 2014/0163731 A1 * | 6/2014 | Shi | B25J 9/1633 | |
| | | | 700/250 | |
| 2014/0226136 A1 * | 8/2014 | Gagnon | G03F 1/82 | |
| | | | 355/30 | |
| 2015/0019013 A1 * | 1/2015 | Rose | G01L 1/16 | |
| | | | 700/258 | |
| 2015/0242540 A1 | 8/2015 | Shapiro et al. | | |
| 2015/0273688 A1 | 10/2015 | Yamaguchi et al. | | |
| 2015/0290795 A1 * | 10/2015 | Oleynik | G05B 19/42 | |
| | | | 700/257 | |
| 2016/0058519 A1 * | 3/2016 | Herr | A61B 5/107 | |
| | | | 600/438 | |
| 2016/0059412 A1 * | 3/2016 | Oleynik | B25J 9/163 | |
| | | | 700/257 | |
| 2016/0167227 A1 * | 6/2016 | Wellman | B25J 9/1612 | |
| | | | 700/259 | |
| 2016/0167228 A1 * | 6/2016 | Wellman | B25J 9/1612 | |
| | | | 700/218 | |

* cited by examiner

VALIDATION OF ROBOTIC ITEM GRASPING

CROSS-REFERENCE TO RELATED APPLICATIONS

This application is related to and incorporates by reference for all purposes the full disclosure of co-pending U.S. patent application Ser. No. 14/966,912, filed concurrently herewith, entitled "FEATURE IDENTIFICATION AND EXTRAPOLATION FOR ROBOTIC ITEM GRASPING".

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators are instructed to perform tasks under the same conditions. For example, a robotic manipulator may be instructed to identify a particular object having a fixed orientation within a box and grasp the object using an arm tool of the robotic manipulator. If the object is not in the fixed orientation, however, the robotic manipulator may be unable to grasp the object. Because of this, other systems that rely on the object being removed may be impacted and the benefits of the robotic manipulator may be minimized.

BRIEF DESCRIPTION OF THE DRAWINGS

Various embodiments in accordance with the present disclosure will be described with reference to the drawings, in which.

DETAILED DESCRIPTION

Figure 1:
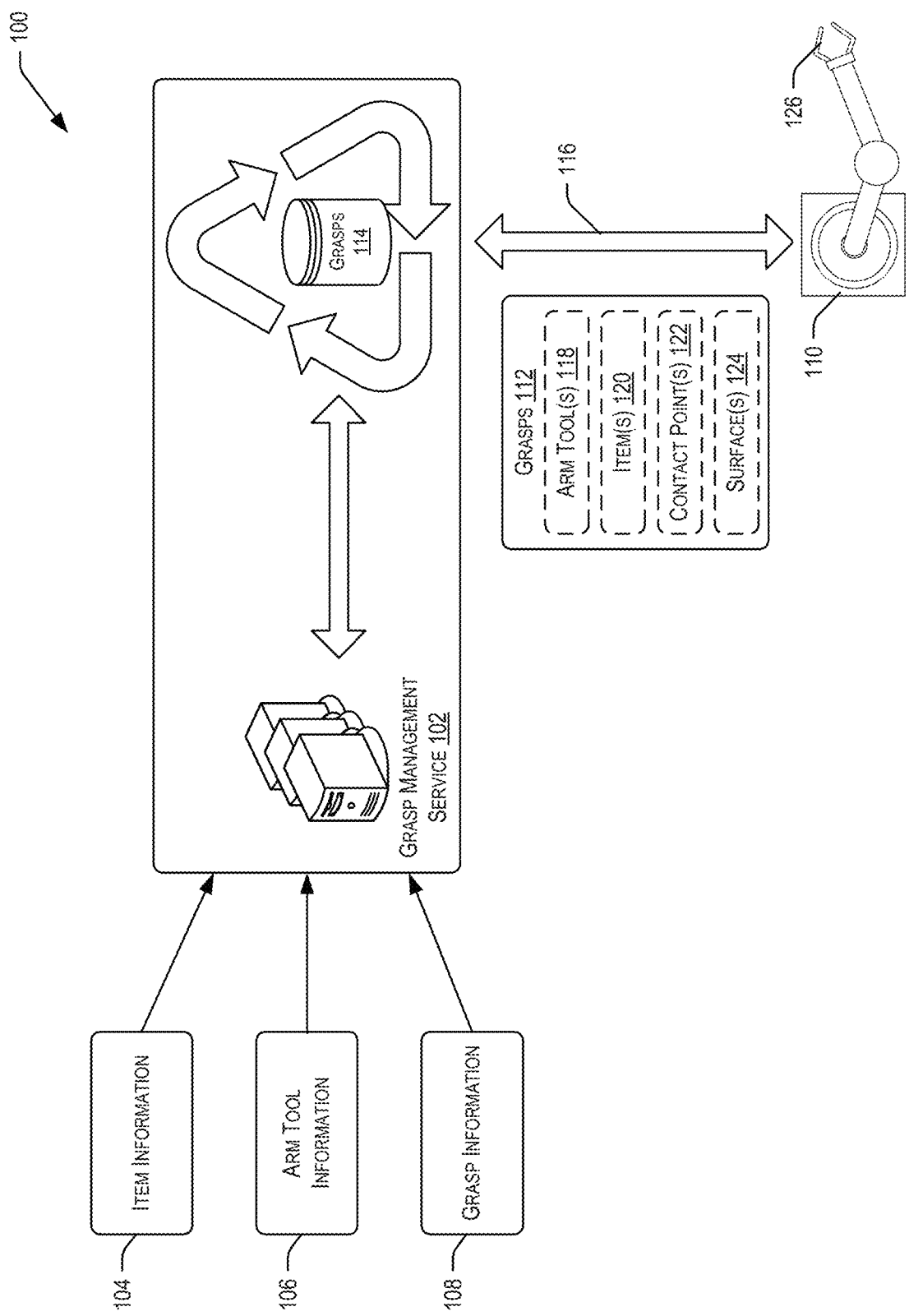
FIG. 1 is an example diagram depicting techniques relating to generating and validating grasp sets for robotic manipulators as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a grasp management system and techniques for generating grasp sets and validating grasp sets based on orientation of an item, orientation of an end of arm tool, or an end of arm tool. A grasp may include information to cause a robotic manipulator such as a robotic arm to control an end of arm tool to pick up or move an item. To this end, a grasp may identify one or more contact points on the item and a grasping function for the end of arm tool to use to manipulate the item (e.g., move the item or pick the item up). Grasp sets can be generated in any suitable manner including by a human operator teaching a robotic manipulator an initial grasp and automatically generating other predictably successful grasps based on the initial grasp. Predictably successful sets of grasps can be validated to determine whether the grasps are indeed feasible for manipulating the item when the item is in one or more orientations and when the end of arm tool is in one or more particular orientations with respect to the item. This process of validation may be performed automatically by the robotic manipulator attempting to pick up the item using each of the predictably successful grasps in an actual test environment or in a simulated environment. The results of this process may be recorded and used to compute richness measures for subsets of feasible grasps (e.g., predictably successful grasps that are capable of being successfully repeated based on different orientations of the item or the end of arm tool) and an overall richness measure for an entire set of feasible grasps for the item. An example richness measure for a given set of feasible grasps may be representative of spatial variation of grasps within the given set of feasible grasps. In this manner, a high spatial variation of grasps may correlate to a high richness measure. The richness measure for the given set of feasible grasps may be used to determine whether the given grasp set would benefit from generation and validation of additional grasps. The richness measure may also be used to determine when the set of feasible grasps has a suitable number of grasps such that the robotic manipulator can be expected to confidently pick up the item using any one of the grasps.

In a particular example, a new item is received which is oddly shaped. Because of the odd shape, it may be difficult to automatically generate predictably successful grasps for picking up the item; especially, when the item is in some item orientations. A human may receive an instruction describing which orientations have little or no predictably successful grasps. The human may attempt to expand or create grasp sets for various item orientations by operating a robotic arm to cause an end of arm tool to pick up the item multiple times in the various item orientations. Information describing this process (e.g., item orientations, grasp orientations, success rates, etc.) may be saved. Under the management of a grasp management service, the robotic arm may use the saved information to attempt to repeat the grasps taught by the human and attempt any other grasps that may have been previously associated with the item (e.g., grasps previously generated for at least one item orientation). Information about these attempted grasps may be retained by the grasp management service and used to compute richness measures for different subsets of grasp sets and an overall richness measure for a complete grasp set for the item. For example, a richness measure may be computed for a subset of grasps that correspond to a particular item orientation of the item. The richness measure(s) may also be computed after the grasps sets have been expanded through simulation and execution using the actual robotic manipulator.

Referring now to the figures in which like-referenced numerals and/or names may refer to like elements, FIG. 1 illustrates a diagram 100 including a grasp management service 102. The grasp management service 102 as described in more detail herein may be configured to implement the techniques relating to generating and validating grasp sets. To this end, the grasp management service 102 may receive item information 104, arm tool information 106, and grasp information 108. The item information 104 may include information about items that a robotic manipulator 110 such as a robotic arm may be capable of manipulating (e.g., picking up or moving in some manner). The arm tool information 106 may include information about different arms tools that can be used by the robotic manipulator 110 to grasp the items identified by the item information 104. The grasp information 108 may include information about grasps that can be attempted by the arm tools identified by the arm tool information 106 to grasp the items identified by the item information 104. In some examples, the grasp information 108 may include grasps that are taught by human operators or determined in some other manner. The grasps may be associated with certain arm tools and items identified by the arm tool information 106 and the item information 104.

The grasp management service 102 may utilize the information 104-108 to generate and validate grasps 112. The grasps 112 may be saved in a grasp database 114 or other comparable structure associated with the grasp management service 102. Generating the grasps 112 may include expanding a basic set of grasps to include predictive grasps. These predictive grasps and the basic set of grasps can be tested using the robotic manipulator 110 or using a simulation environment that simulates the function of the robotic manipulator 110 or analyzes the predictive grasps and the basic set of grasps analytically. Information about the grasps 112 can be provided to the robotic manipulator 110, as illustrated by arrow 116. This information can include arm tool information 118, item information 120, contact point information 122, and surface information 124 related to the grasps 112. For example, the arm tool information 118 may indicate which arm tools have been used or could be used to execute the grasps 112. Likewise, the item information 120 may indicate which items and item features have been used or could be used to execute the grasps 112. The contact point information 122 may indicate contact points on the items 120 and/or features of the items 120 that have been used or could be used to execute the grasps 112. The surface information 124 may indicate surfaces on the items 120, which include one or more contact points 122 and which have been used or could be used to execute the grasps 112.

Additional grasps 112 may be generated in a manner that expands any one of the arm tool information 118, the item information 120, the contact point information 122, or the surface information 124. For example, a particular grasp 112 that was developed using arm tool A to grasp item X, can be expanded to include using arm tool B to grasp item X, or to include using arm tool A to grasp item Y. In some examples, expanding the grasps 112 may be performed by the grasp management service 102 in a manner that is disconnected from the hardware on which initial grasps 112 were generated. This may be desirable to generate grasps 112 for a wide variety of items such as inventory items in a large-scale inventory system.

In order to expand the grasps 112 and/or to validate the grasps 112, the robotic manipulator 110 may be configured to receive the grasps 112 from the grasp management service 102 and attempt to execute the grasps 112, as illustrated by the arrow 116. In some examples, the attempts made by the robotic manipulator 110 are made under test conditions, in a simulation environment, analytically, or under actual operating conditions. In any event, in addition to the grasps 112 or together with the grasps 112, the grasp management service 102 may provide instructions to the robotic manipulator 110 regarding how to attempt to execute the grasps 112. For example, the instructions may include computer executable instructions that a processor associated with the robotic manipulator 110 can execute. These instructions may instruct the robotic manipulator 110 to identify a test item, attempt to pick up the test item using an end of arm tool 126, which may be identified by the arm tool information 118. The instructions may further instruct the robotic manipulator 110 to record and/or transmit certain information such as success rates for each grasp from the grasps 112.

Information gathered while testing and/or validating grasps (e.g., executing the grasps 112 by the robotic manipulator 110) can be provided back to the grasp management service 102, as illustrated by the arrow 116. This information can include whether the robotic manipulator 110 was able to pick up the item, locations on the item where an end of arm tool 126 of the robotic manipulator 110 contacted the item, success rates for multiple attempted grasps, orientation information relating to an orientation of the item or an orientation of the end of arm tool 126 with respect to the item, and any other suitable information. At least a portion of this information may be used by the grasp management service 102 to determine a richness measure for the grasps 112, which may be larger or smaller than when provided to the robotic manipulator 110. The richness measure may represent a spatial variation of grasping locations (e.g., contact points where an end of arm tool has successfully grasped the item) with respect to surface area of the item. For example, an item that has many possible grasping locations along a top surface can be said to have a high richness measure with respect to the top surface. The grasp management service 102 may also use at least a portion of this information to validate grasps for different end of arm tools. For example, a set of grasps developed for a first end of arm tool may be validated for a second end of arm tool. In this manner, it may be determined which of the end of arm tools is better suited for picking up the item.

Figure 2:
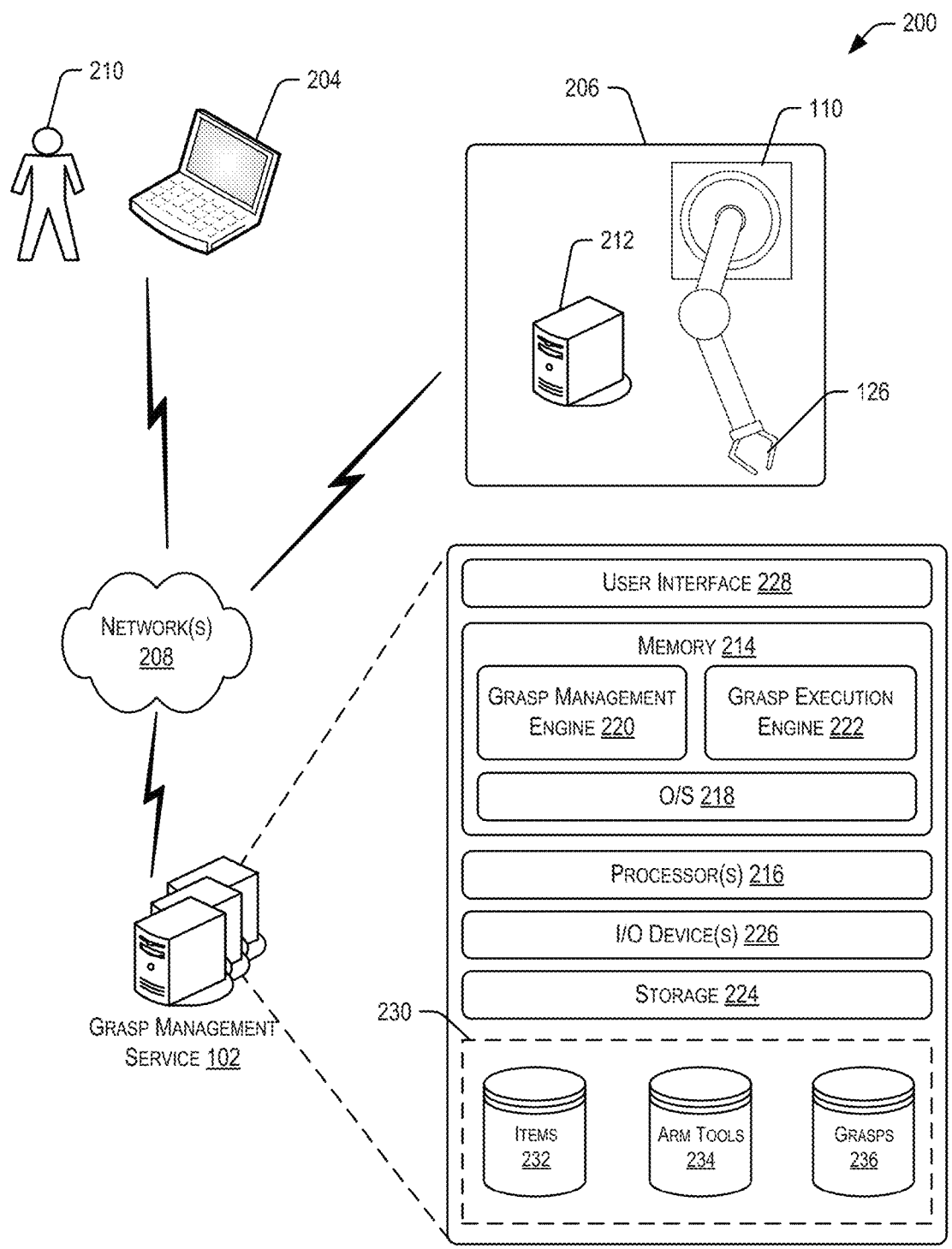
FIG. 2 is an example schematic architecture for implementing techniques relating to generating and validating grasp sets for robotic manipulators as described herein, according to at least one example.

FIG. 2 illustrates an example architecture 200 for implementing techniques relating generating grasp sets and validating grasp sets as described herein. The architecture 200 may include the grasp management service 102 in communication with a user device 204 and a manipulator system 206 via one or more networks 208 (hereinafter, "the network 208"). The user device 204 may be operable by a user 210 to interact with the grasp management service 102 and/or the manipulator system 206. The manipulator system 206 may include the robotic manipulator 110 and a management device 212. The user 210 may use the user device 204 to connect to and control the robotic manipulator 110. For example, the user 210 may use the user device 204 to teach the robotic manipulator 110 to pick up an item. In some examples, the grasp management service 102 provides a user interface that enables the user 210 utilizing the user device 204 to operate the robotic manipulator 110. The network 208 may include any one or a combination of many different types of networks, such as cable networks, the Internet, wireless networks, cellular networks, and other private, and/or public networks.

The user device 204 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the grasp management service 102 and/or the manipulator system 206 via the network 208 in accordance with techniques described herein.

As introduced above, the manipulator system 206 may include the management device 212 in electrical and/or network communication with the robotic manipulator 110. The robotic manipulator 110 may include any suitable type and number of sensors disposed throughout the robotic manipulator 110 (e.g., in a base, in an arm, in joints in the arm, in the end of arm tool 126, within fingers of the end of arm tool 126, or in any other suitable location). The sensors can include sensors configured to detect pressure, force, weight, light, objects, slippage of items, power consumed during operation and any other information that may be used to control and/or monitor the operation of the robotic manipulator 110, including the end of arm tool 126. For example, one or more sensors may detect that a first grasp on an item results in higher slippage and requires more force than a second grasp on the item. The sensors may be in communication with the management device 212. In this manner, the management device 212 may control the operation of the robotic manipulator 110 and the end of arm tool 126 based at least in part on sensing information received from the sensors. The sensing information may also be used as feedback to adjust the grasps used by the end of arm tool 128, to generate new grasps, to validate grasps, and to determine quality values for grasps, which may be a numerical value based at least in part on one or more objective factors.

The management device 212 may be configured to receive instructions from the grasp management service 102 and/or the user device 204 in order to control operations of the robotic manipulator 110. In some examples, the management device 212 manages the operation of the robotic manipulator 110 autonomously or semi-autonomously. For example, the management device 212 may receive a set of grasps from the grasp management service 102 and test the grasps without further instructions from the grasp management service 102. In some examples, the results of this test and any new grasps identified can be provided back to the grasp management service 102 for further generation and/or validation of the set.

The grasp management service 102 may include one or more service provider computers, perhaps arranged in a cluster of servers or as a server farm, and may host web service applications. These servers may be configured to perform computing operations as described herein. In some examples, the servers (and the components thereof) may be distributed throughout more than one location. The servers may also be virtual computing resources. The grasp management service 102 may be implemented as part of an inventory management system that is associated with an electronic marketplace. Through the electronic marketplace users may place orders for items. In response, the inventory management system may determine shipping instructions for retrieving the items from their physical storage locations and coordinating their shipping. In some examples, the shipping instructions may be based on the inventory packing instructions described herein. For example, a retrieval portion of the shipping instructions may include an inventory mapping of the packing locations for the items. The retrieval portion may be provided to the manipulator system 206 for retrieval of the items. For example, the items may be retrieved from a bin of items. As the manipulator system 206 retrieves items as part of customer orders or otherwise, success metrics may be gathered and used to improve the set of grasps attempted by the robotic manipulator 110 as part of retrieving the items or otherwise operating under actual operating conditions. In some examples, the grasp management service 102 may be implemented as a service within the inventory management system. In this manner the grasp management service 102 can access components of the inventory management system and easily share information with the inventory management system.

The grasp management service 102 may include at least one memory 214 and one or more processing units (or processor(s)) 216. The processor 216 may be implemented as appropriate in hardware, computer-executable instructions, software, firmware, or combinations thereof. Computer-executable instruction, software, or firmware implementations of the processor 216 may include computer-executable or machine-executable instructions written in any suitable programming language to perform the various functions described. The memory 214 may include more than one memory and may be distributed throughout the grasp management service 102. The memory 214 may store program instructions that are loadable and executable on the processor(s) 216, as well as data generated during the execution of these programs. Depending on the configuration and type of memory including the grasp management service 102, the memory 214 may be volatile (such as random access memory (RAM)) and/or non-volatile (such as read-only memory (ROM), flash memory, or other memory). The memory 214 may include an operating system 218 and one or more application programs, modules, or services for implementing the features disclosed herein including at least a grasp management engine 220 and a grasp execution engine 222. As described in detail herein, the grasp management engine 220 may be configured to generate and validate grasp sets. The grasp execution engine 222 may be configured to instruct one or more robotic manipulators to execute a set of grasps that have been generated and validated as described herein. In some examples, the management device 212 includes the same or similar functionality as the grasp management service 102. For example, the management device 212 may include an engine comparable to the grasp management engine 220 and an engine comparable to the grasp execution engine 222.

The grasp management service 102 may also include additional storage 224, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 224, both removable and non-removable, is an example of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the grasp management service 102.

The grasp management service 102 may also include input/output (I/O) device(s) and/or ports 226, such as for enabling connection with a keyboard, a mouse, a pen, a voice input device, a touch input device, a display, speakers, a printer, or other I/O device.

The grasp management service 102 may also include a user interface 228. The user interface 228 may be utilized by an operator or other authorized user to access portions of the grasp management service 102. In some examples, the user interface 228 may include a graphical user interface, web-based applications, programmatic interfaces such as application programming interfaces (APIs), or other user interface configurations. The grasp management service 102 may also include a data store 230. In some examples, the data store 230 may include one or more data stores, databases, data structures, or the like for storing and/or retaining information associated with the grasp management service 102. For example, the data store 230 may include databases, such as an item database 232, an arm tool database 234, and a grasp database 236.

The item database 232 may be configured to retain information such as the item information 104 and other suitable information that identifies items. The information in the item database 232 may be organized in any suitable manner to enable access by components of the grasp management service 102 such as the grasp management engine 220. The item database 232 may include an entry for each inventory item that the grasp management service 102 may encounter. As a result, this may include entries on a scale of hundreds of thousands or even millions. For each entry that corresponds to an item, the item database 232 may include an item identifier (e.g., a unique product identifier), a description of the item, one or more stock images of the item, a surface model of the item or a link to the surface model of the item, a primitive shape model of the item or a link to the primitive shape model, a bounding box representation of the item, one or more actual images of the item (e.g., taken as it entered a facility), dimensions of the item (e.g., height, width, length), a location of a center of mass, a total weight, and any other suitable of information related to the item. This information can be used as part of determining a set of grasps for picking up the item and validating those grasps.

The arm tool database 234 may be configured to retain the information such as the arm tool information 106 and any other suitable information associated with the arm tools described herein. In some examples, information stored in the arm tool database 234 may be organized according to different categories of arm tools and may include specification information for each arm tool. This may include capacities of the arm tools in terms of amount of force, pressure, voltage, current, and geometric constraints, contact point constraints, and any other constraint. Any suitable end of arm tool including any suitable grasping function may be included in the arm tool database 234 and may be utilized in accordance with techniques described herein. A grasping function may define functionally how an end of arm tool is capable of manipulating an item. The grasping function may differ between end of arm tools with respect to capacities, categories, and physical limitations. Example categories of end of arm tools include: soft robotic arm tools, vacuum arm tools, electro-adhesion arm tools, and mechanical or electromechanical arm tools. Soft robotic arm tools may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum arm tools may grasp items using suction. Electro-adhesion arm tools can include an array of electrodes arranged along a flexible or rigid substrate capable of applying a charge (akin to static electricity) that can adhere an item to the substrate portions that are in contact with the item. Mechanical or electromechanical arm tools may include pinchers, claws, grippers, or other rigid components that may be actuated relative to one another for grasping an item. Other arm tools may also be utilized to facilitate additional grasping functions.

The grasp database 236 may be configured to retain information such as the grasp information 108 and the grasps 112. In this manner, the grasp database 236 may be an example of the grasp database 114 described herein. The grasp database 236 may be configured to retain information about grasps that have been generated, taught, validated, attempted, or otherwise managed as described herein. For each grasp, the grasp database 236 may retain an arm tool used for the grasp, an item or feature of an item associated with the grasp, one or more grasping surfaces on the item or feature of the item, contact points within the grasping surfaces where the arm tool may contact the when executing the grasp, primitive shapes corresponding to features of the item, success rates for this particular grasp, an orientation of the item associated with this particular grasp, an orientation of an end of arm tool with respect to the item associated with this particular grasp, and/or any other suitable information pertaining to a grasp. In some examples, the grasps stored in the grasp database 236 may be determined at one or more testing locations (e.g., an environment where an actual robotic manipulator may iteratively attempt to grasp an item or a simulated environment where similar attempts can be made in simulation or calculated analytically). Once a suitable number of grasps have been determined and, in some examples, validated, the grasp database 236 may be made accessible for other robotic manipulators operating under actual conditions. This may be done by making the grasp database 236 accessible via a cloud-based server, networked server, or in any other suitable manner. For example, robotic manipulators that handle inventory in one or more warehouses located throughout a geographic region can access the grasp database 236 simultaneously or copies of the grasp database 236 to search for appropriate grasps based on the conditions they encounter. Using techniques described herein, the success, and failure of the grasps from the grasp database 236 under actual conditions may be used to update the grasps from the grasp database 236. This may include eliminating certain grasps from consideration, adjusting probabilities of success for certain grasps, adding new grasps learned under actual conditions, and any other suitable updates. Storage of the grasp information described herein in the grasp database 236 may improve the functioning of the grasp management service 102 by enabling quicker and more efficient searching of feasible grasps.

Figure 3:
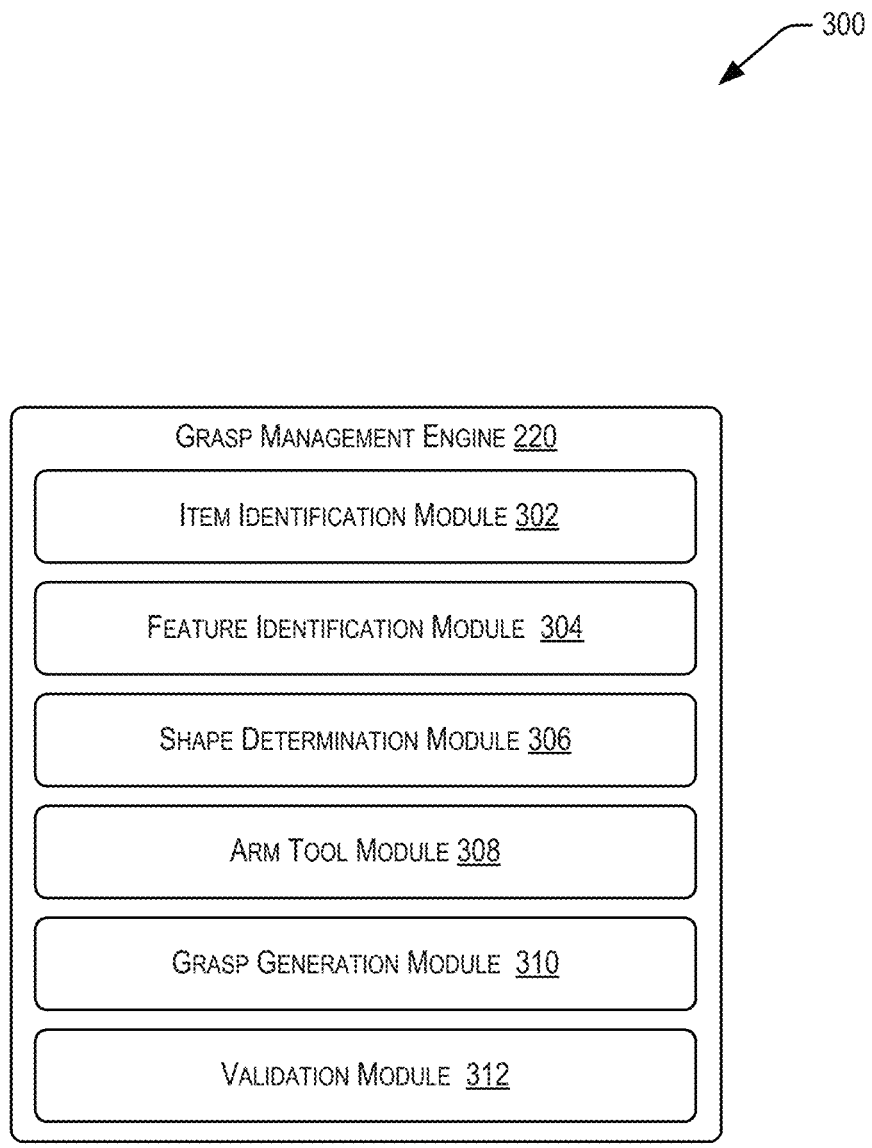
FIG. 3 is an example device for implementing techniques relating to generating and validating grasp sets for robotic manipulators as described herein, according to at least one example.

FIG. 3 illustrates an example device 300 including the grasp management engine 220. The grasp management engine 220 may be configured to manage one or more sub-modules, components, and/or services directed to examples disclosed herein. In some examples, the grasp management engine 220 may include an item identification module 302, a feature identification module 304, a shape determination module 306, an arm tool module 308, a grasp generation module 310, and a validation module 312. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein.

The item identification module 302 may be configured to access information about items in the item database 232. This can include, for example, general characteristics of the items and aspects of the items that are determined using the techniques described herein. For example, the item identification module 302 may be configured to access information about a set of grasping surfaces on item. In some examples, the item identification module 302 receives sensing information captured by a robotic arm and identifies an item based on the sensing information. For example, a sensor may scan a barcode on the item and barcode information may be used by the item identification module 302 to identify the item.

The feature identification module 304 may be configured to identify features of items identified by the item identification module 302. This can include, for example, analyzing a model of an item and a set of grasping surfaces corresponding to a feature of the item to identify other features of the item. In some examples, the feature identification module 304 may be capable of processing a surface model of an item to identify features that can be used for grasping the item.

The shape determination module 306 may be configured to determine one or more primitive shapes based on one or more grasping surfaces. For example, after a robotic manipulator has been taught to pick up an item by a feature of the item (e.g., a handle of a coffee mug), the shape determination module 306 may function to generate a primitive shape that corresponds to the handle. The primitive shape may be selected from a set of primitive shapes to closely correspond to the part. The set of primitive shapes may include shapes such as cuboids, cylinders, pyramids, spheres, cones, toroids, and any other suitable primitive shapes. If a single primitive shape cannot be found that corresponds closely to the handle (e.g., by comparing the volume of the handle with the volume of the primitive shape), a second primitive shape may be selected and combined with the first. The second primitive shape may be of the same type as the first or different. Use of more than one primitive shape may, in some examples, result in a better approximation of the shape volume of the handle. In some examples, a primitive shape may be selected that simply approximates two parallel surfaces (e.g., where opposing fingers of a two-finger grabber contact an item). The shape determination module 306 may be configured to calculate fill volumes. In some examples, primitive shapes generated by the shape determination module 306 may be stored together with their associated grasps in the grasp database 236, together with the arm tools in the arm tool database 234 which can pick up an item having the primitive shapes, and/or together with the items in the item database 232 from which the primitive shapes were derived.

The arm tool module 308 may be configured to access information about end of arm tools as used herein. To this end, the arm tool module 308 may be configured to access the arm tool database 234. The arm tool module 308 may also be configured to access information identifying a particular arm tool that is being used to manipulate an item.

The grasp generation module 310 may be configured to generate grasps for end of arm tools to grasp items. The grasp generation module 310 may access any suitable information in order to generate the grasps. In some examples, the grasp generation module 310 may be used to generate grasps in response to input from a human operator. For example, the human operator may use the grasp generation module 310 to teach a robotic arm how to manipulate an end of arm tool to pick up an item. The grasp generation module 310 may then save the characteristics of the taught grasp in the grasp database 236 or in some other location. The grasp generation module 310 may access the taught grasp and other successful grasps in order to generate other potential grasps for grasping the same item or other similar items using the same end of arm tool or other end of arm tools, as described herein.

The validation module 312 may be configured to evaluate and validate a set of grasps using a simulation environment or an actual environment. In some examples, the validation module 312 may include functionality to cause a robotic manipulator to autonomously and iteratively evaluate a set of grasps on an item. This may include varying the orientation of the item with respect to the robotic manipulator (e.g., rotating the item to expose different features and/or surfaces), varying the orientation of an end of arm tool with respect to the item, attempting each grasp one or more times, recording successes rates for each grasp based on attempted grasps, and any other suitable aspect related to evaluating and validating a set of grasps. In some examples, the validation module 312 may function to expand the set of validated grasps to form an expanded set of grasps. This may be achieved, in part, by the validation module 312 evaluating successful grasps from the set to identify predictably successful grasps. These predictably successful grasps may be grasps that the validation module 312 has predicted would likely be successful. The validation module 312 may evaluate the set of predictably successful grasps for feasibility by causing the robotic manipulator to execute the set of predictably successful grasps. This may include executing each of the predictably successful grasps multiple times and recording success rates. These success rates may be used to determine a probability of success for each predictably successful grasp, that may result in the expanded set of feasible grasps.

The validation module 312 may also be configured to determine a richness measure based on its evaluation and validation of sets of grasps. The richness measure may represent a spatial variation of grasps within a particular grasp set. This may include a spatial variation with respect to a particular item, a particular orientation of the item with respect to the robotic manipulator, a particular grasping orientation of an end of arm tool with respect to the item, a particular arm tool, and any other suitable factor. In some examples, the richness measure normalizes differences between grasps in a given grasp set to a surface area of the item. In this manner, the richness measure may be independent of the size of the item. Richness measures for items, irrespective of size, may be compared. The richness measure may be used to determine when a given grasp set is sufficiently complete. For example, when a grasp set has a high richness measure (e.g., that meets or exceeds a threshold), the grasp set may be considered "complete." In this example, the grasp set may be stored and used in the future to grasp the given item. If, for example, the richness measure for a grasp set for an item or a grasp set for an orientation of an item fails to meet a threshold (e.g., has a low value), the grasp set may be evaluated using techniques described herein in order to expand the grasp set. This may include identifying predictably successful grasps that can be evaluated on hardware (e.g., the robotic manipulator, actual item, and/or end of arm tool) to determine whether the actual grasps will be successful under actual conditions.

Figure 4:
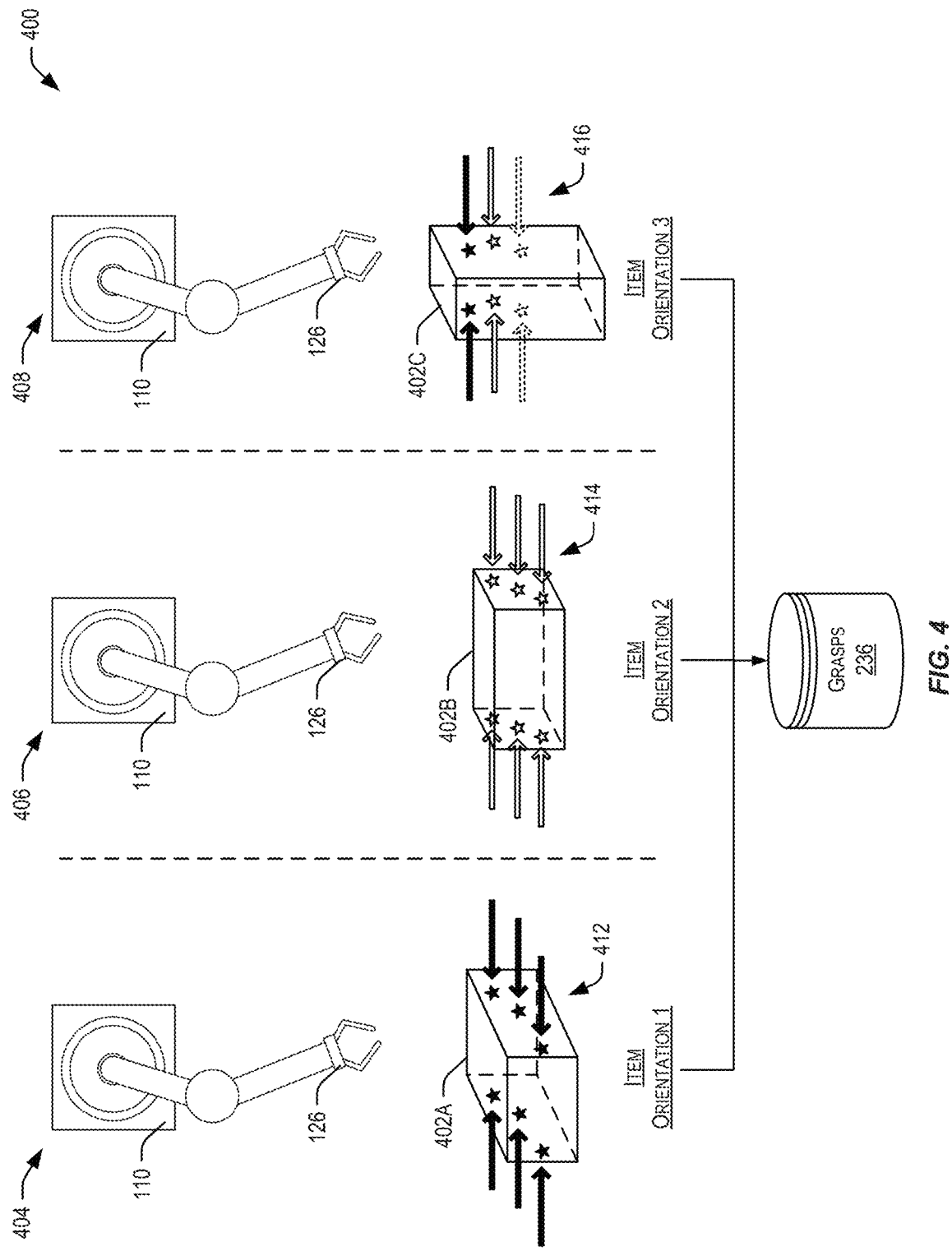
FIG. 4 is a diagram depicting techniques relating to validating grasp sets for robotic manipulators as described herein, according to at least one example.

FIG. 4 illustrates a diagram 400 that depicts an item 402 in various item orientation states 404-408 with respect to the robotic manipulator 110. The robotic manipulator 110 may operate in connection with or under management of the grasp management service 102. The diagram 400 may be representative of a process for validating a set of grasps for the item 402. The set of grasps may have been previously generated in any suitable manner, including using grasp generation techniques, or in response to human input. In any event, the set of grasps may include grasps that have been predicted as being successful and/or at least some grasps that have been validated as being feasible.

In each of the item orientation states 404-408, an orientation of the item is varied with respect to the robotic manipulator 110 and the robotic manipulator 110 attempts to pick up the item 402 by causing the end of arm tool 126 to attempt the grasps associated with the particular orientation. These grasps may represent a subset of the set of grasps discussed above. A grasping orientation of the robotic manipulator 110 may be held constant while the item orientation is varied. The grasping orientation may represent a starting position and direction from which the end of arm tool 126 will approach the item 402, any intermediate positions of the end of arm tool 126, an ending position of the end of arm tool 126, orientations of the end of arm tool 126 with respect to the item from the starting position to the ending position, and any other aspect of related to translation and/or rotation of the end of arm tool 126. For example, a grasping orientation may define that the end of arm tool 126 approach a top of the item 402 or from one of the sides of item 402 (e.g., front, back, left side, or right side) and grasp the item 402 with opposing surfaces of the end of arm tool 126 parallel to corresponding surfaces on the item 402. In some examples, grasps may be validated based on a grasping orientation that is likely to be feasible or likely to be implemented. For example, grasps that approach from the top of an item may be desirable for situations where inventory is stored in high density storage, and may therefore be a good candidate for validation.

Opposing arrows adjacent the item 402 may indicate attempted grasps by the end of arm tool 126. A predictably successful grasp that has been successfully validated may be illustrated as two opposing filled-in stars. A predictably successful grasp that has failed validation (e.g., was attempted but failed) may be illustrated as two opposing open stars. A predictably successful grasp that was unable to be validated may be illustrated as two opposing open stars with dashed outlines.

With reference to the item orientation state 404, the item 402A is illustrated in a first item orientation. The robotic manipulator 110 may attempt three grasps 412 by causing the end of arm tool 126 to grasp opposing sides of the item 402A. The robotic manipulator 110 may successfully pick up the item 402A using each of the three grasps 412. Information describing attempts by the robotic manipulator 110 to pick up the item 402A may be saved in the grasp database 236 or other suitable data structure. This information may include locations of contact points on the item 402A associated with the grasps 412 (illustrated by the filled-in stars), sensing information collected from one or more sensors on the robotic manipulator 110 before, during, or after a grasp has been executed, and any other suitable information. In some examples, the grasp management service 102 may use at least a portion of the information saved in the grasp database 236 to determine whether the grasp set is complete with respect to the first item orientation. This may be a product of whether or not the richness measure, which may also be computed by the grasp management service 102 and based at least in part on the information, meets or exceeds a richness threshold. A notification indicating that the grasp set is complete with respect to the first orientation may be generated and provided to one or more users.

With reference to the item orientation state 406, the item 402B is illustrated in a second item orientation. The robotic manipulator 110 may attempt three grasps 414 by causing the end of arm tool 126 to grasp opposing sides of the item 402B. The robotic manipulator 110 may fail to successfully pick up the item 402B using each of the three grasps 414. Information describing attempts by the robotic manipulator 110 to pick up the item 402B may be saved in the grasp database 236 or other suitable data structure. This information may include locations of contact points on the item 402B associated with the grasps 414 (illustrated by open stars), sensing information collected from one or more sensors on the robotic manipulator 110 before, during, or after a grasp has been executed, and any other suitable information. In some examples, the grasp management service 102 may use at least a portion of the information saved in the grasp database 236 to determine that the grasp set is incomplete with respect to the second item orientation. This may be because in the second item orientation none of the predictably successful grasps 414 of the set of grasps for the second orientation was able to be successfully executed. The completeness may be a product of whether or not the richness measure, which may also be computed by the grasp management service 102 and based at least in part on the information, meets or exceeds a richness threshold. A notification indicating that the grasp set is incomplete with respect to the second item orientation may be generated and provided to one or more users. This notification may be used to generate an instruction (or itself may function as an instruction) for a human to teach the robotic manipulator 110 to pick up the item 402B in the second orientation in order to expand the set of grasps to include other predictably successful grasps. In response to the notification, the grasp management service 102 may also attempt to expand the grasps with respect to the second item orientation via simulation and/or actual attempts in an actual environment.

With reference to the item orientation state 408, the item 402C is illustrated in a third item orientation. The robotic manipulator 110 may attempt three grasps 416 by causing the end of arm tool 126 to grasp opposing sides of the item 402C. The robotic manipulator 110 may successfully pick up the item 402C using a first grasp, fail to successfully pick up the item 402C using a second grasp, and be unable to validate a third grasp. The third grasp may extend beyond the physical limits of the end of arm tool 126 or the robotic manipulator 110 and may therefore not be cable of being validated. Information describing the attempts by the robotic manipulator 110 to pick up the item 402C may be saved in the grasp database 236 or other suitable data structure. This information may include locations of contact points on the item 402C associated with the grasps 416 (illustrated by filled-in stars, open stars, and open stars with dashed outlines), sensing information collected from one or more sensors on the robotic manipulator 110 before, during, or after a grasp has been executed, and any other suitable information. In some examples, the grasp management service 102 may use at least a portion of the information saved in the grasp database 236 to determine whether the grasp set is complete with respect to the third item orientation. The grasps 416 may be considered partially complete. This may be because at least one grasp was validated while others were not. A richness threshold may indicate that more than one successful grasp should be validated for the item 402C in order for the grasp set to be considered complete. Thus, the completeness may be a product of whether or not the richness measure, which may also be computed by the grasp management service 102 and based at least in part on the information, meets or exceeds the richness threshold. A notification indicating that the grasp set is partially complete with respect to the third item orientation may be generated and provided to one or more users. This notification may be used to generate an instruction (or itself may function as an instruction) for a human to teach the robotic manipulator 110 to pick up the item 402C in the third item orientation in order to include other predictably successful grasps. In response to the notification, the grasp management service 102 may also attempt to expand the grasps with respect to the third item orientation via simulation and/or actual attempts in an actual environment.

Figure 5:
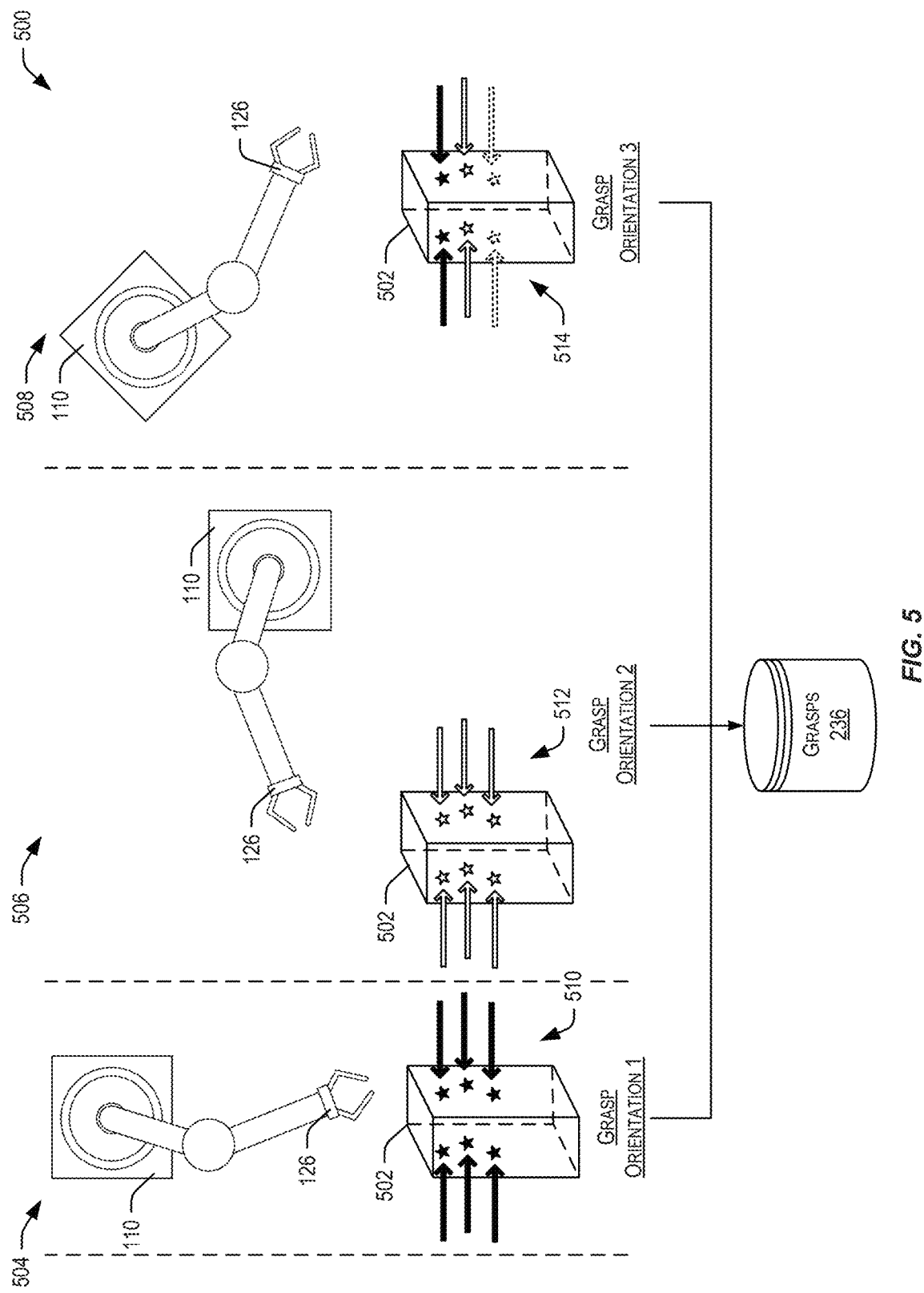
FIG. 5 is a diagram depicting techniques relating to validating grasp sets for robotic manipulators as described herein, according to at least one example.

FIG. 5 illustrates a diagram 500 that depicts the robotic manipulator in various grasping orientation states 504-508 with respect to an item 502. The robotic manipulator 110 may operate in connection with or under management of the grasp management service 102. The diagram 500 may be representative of a process for validating a set of grasps for the item 502. The set of grasps may have been previously generated in any suitable manner, including using grasp generation techniques, or in response to human input. In any event, the set of grasps may include grasps that have been predicted as being successful and/or at least some grasps that have been validated as being feasible.

In each of the grasping orientation states 504-508, an orientation of the robotic manipulator 110 is varied with respect to the item 502. Also in each grasping orientation state 504-508, the robotic manipulator 110 makes one or more attempts to pick up the item 502 by causing the end of arm tool 126 to attempt the grasps associated with the particular grasping orientation. These grasps may represent a subset of the set of grasps discussed above. An item orientation of the item 502 may be held constant while the grasping orientation is varied. Opposing arrows may indicate attempted grasps by the end of arm tool 126. A predictably successful grasp that has been successfully validated may be illustrated as two opposing filled-in stars. A predictably successful grasp that has failed validation (e.g., was attempted but failed) may be illustrated as two opposing open stars. A predictably successful grasp that was unable to be validated may be illustrated as two opposing open stars with dashed outlines.

Similarly as was discussed with reference to FIG. 4, in each of the grasping orientation states 504-508, the robotic manipulator 110 may attempt one or more grasps 510, 512, and 514 respectively by causing the end of arm tool 126 to grasp opposing sides of the item 502. In the first grasping orientation state 504, the robotic manipulator 110 may successfully pick up the item 502 using each of the three grasps 510. In the second grasping orientation state 506, the robotic manipulator 110 may fail to successfully pick up the item 502 using each of the three grasps 512. In the third grasping orientation state 508, the robotic manipulator 110 may successfully pick up the item 502 using a first grasp, fail to successfully pick up the item 502 using a second grasp, and be unable to validate a third grasp. The third grasp may extend beyond the physical limits of the end of arm tool 126 or the robotic manipulator 110 and may therefore not be cable of being validated. Information describing attempts by the robotic manipulator 110 to pick up the item 502 (e.g., the grasps 510-514) may be saved in the grasp database 236 or other suitable data structure. This information may include locations of contact points on the item 502 associated with the grasps 510-514 (illustrated by the stars), sensing information collected from one or more sensors on the robotic manipulator 110 before, during, or after a grasp has been executed, and any other suitable information. In some examples, the grasp management service 102 may use at least a portion of the information saved in the grasp database 236 to determine completeness of the grasp set with respect to each of the grasping orientations. This may be a product of whether or not a richness measure, which may also be computed by the grasp management service 102 and based at least in part on the information, meets or exceeds a richness threshold. A notification indicating that the grasp set is complete, incomplete, or partially complete, with respect to any of the grasping orientations may be generated and provided to one or more users. This notification may be used to generate an instruction (or itself may function as an instruction) for a human to teach the robotic manipulator 110 to pick up the item 502 in any grasping orientation identified as something other than complete. In response to the notification, the grasp management service 102 may also attempt to expand the grasps with respect to the grasping orientations via simulation and/or actual attempts in an actual environment.

Figure 6:
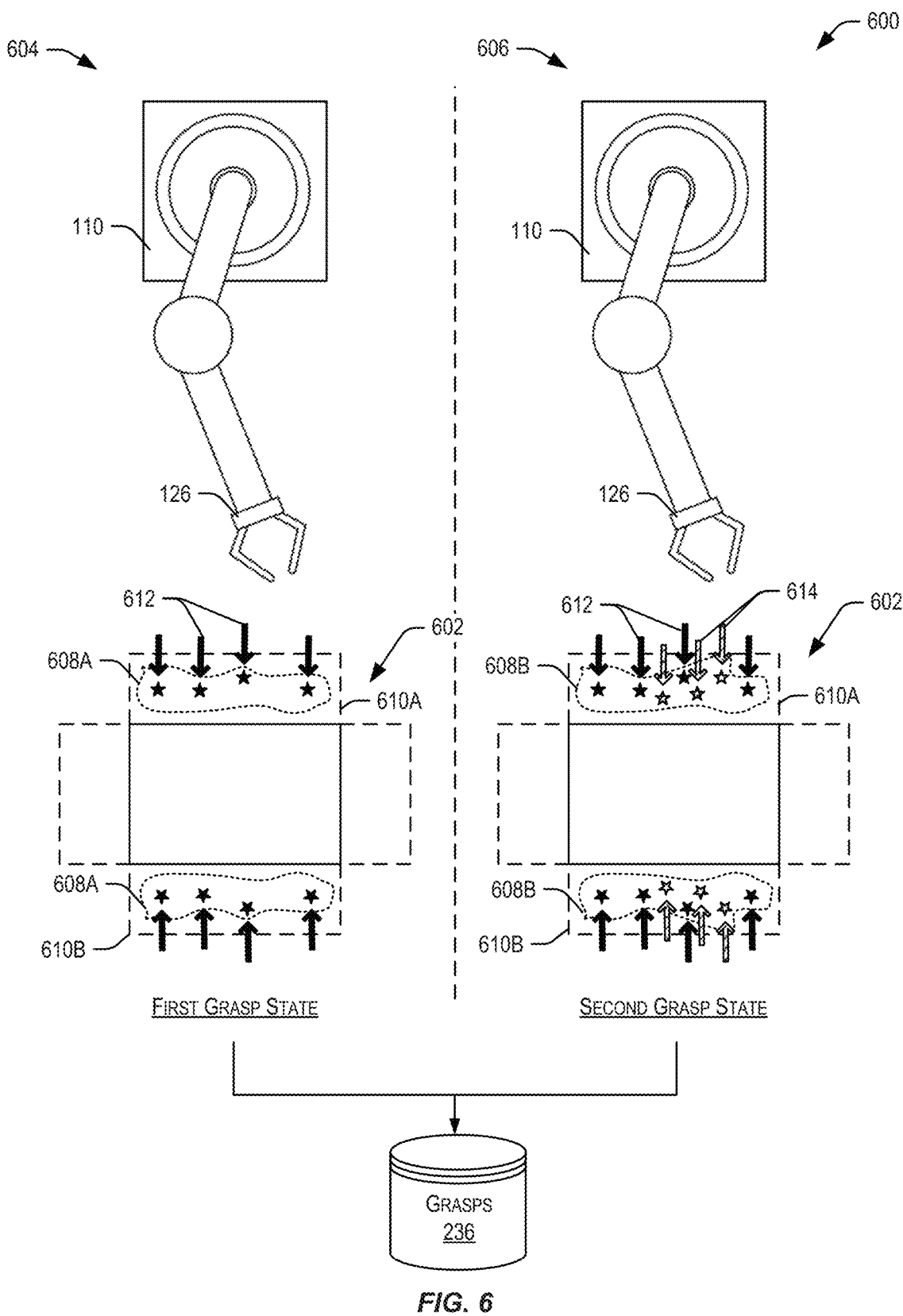
FIG. 6 is a diagram depicting techniques relating to validating grasp sets for robotic manipulators as described herein, according to at least one example.

FIG. 6 illustrates a diagram 600 that depicts an item 602 in various grasp states 604 and 606. The robotic manipulator 110 may operate in connection with or under management of the grasp management service 102 to attempt to pick up the item 602 using a set of grasps. Thus, the diagram 600 may be representative of a process for validating the set of grasps for the item 602 by using the attempts to pick up the item to create a success surface 608. The success surface 608 may be representative of a spatial variation of the set of grasps successfully validated within the success surface 608. In this manner, the success surface 608 may correspond to a richness measure for the set of grasps.

The set of grasps may have been previously generated in any suitable manner, including using grasp generation techniques, or in response to human input. In any event, the set of grasps may include grasps that have been predicted as being successful and/or at least some grasps that have been validated as being feasible. The item 602 is an example item that is a box. The box is illustrated from a top view perspective. For purposes of illustration, vertical sides 610A, 610B of the item 602 (illustrated in dashed lines) have been rotated to lie in the same plane as the top side of the item 602 (illustrated in solid lines). Thus, an attempted grasp to pick up the item from the top using a two-fingered grasper would be illustrated in the view shown in FIG. 6.

In the grasp state 604, a first plurality of grasps 612 have been attempted. In particular, four grasps have been attempted by the robotic manipulator 110 causing the end of arm tool 126 to navigate to first contact locations (illustrated by the filled-in stars) located on the each of vertical sides 610A, 610B and execute a grasping function at each of the first contact locations. These grasps may represent a subset of the set of grasps discussed above. Opposing arrows may indicate attempted grasps by the end of arm tool 126. Based on first the contact locations, the success surface 608A may be defined. The success surface 608A may include an area, which may be a combination of more than one discontinuous area, on the item 602 in which one or more grasps have been validated. In this manner, the success surface 608A may be representative of a spatial variation between each of the contact points associated with each of the grasps 612 after they have been validated. In some examples, the success surface 608A may include a plurality of micro success surfaces that extend around contact points associated with validated grasps 612. For example, the success surface 608A may be made up of eight micro surfaces surrounding each of the contact points associated with the four validated grasps 612.

In the grasp state 606, a second plurality of grasps 614 have been attempted. In particular, three grasps have been attempted by the robotic manipulator 110 causing the end of arm tool 126 to navigate to second contact locations (illustrated by the hatched-in stars) located on the each of vertical sides 610A, 610B and execute a grasping function at each of the second contact locations. The second plurality of grasps 614 may represent a subset of the set of grasps discussed above. Based on the second contact locations, the success surface 608A may be expanded to form an updated success surface 608B. The updated success surface 608B may include an area, which may be a combination of more than one discontinuous area, on the item 602 which includes the first plurality of grasps 612 and the second plurality of grasps 614 that have been validated. In this manner, the success surface 608B may be representative of a spatial variation between each of the contact points associated with each of the grasps 612 and each of the grasps 614 after they have been validated. Information describing the success surfaces 608A and 608B and the attempts by the robotic manipulator 110 to pick up the item 602 (e.g., the grasps 612 and 614) may be saved in the grasp database 236 or other suitable data structure. This information may include locations of contact points on the item 602 associated with the grasps 612 and 614 (illustrated by the stars), extents of the success surface 608, sensing information collected from one or more sensors on the robotic manipulator 110 before, during, or after a grasp has been executed, and any other suitable information. In some examples, the grasp management service 102 may use at least a portion of the information saved in the grasp database 236 to compute a richness measure of the grasp set, a quality value for each of the grasps in the grasp set, and any other suitable information.

Figure 7:
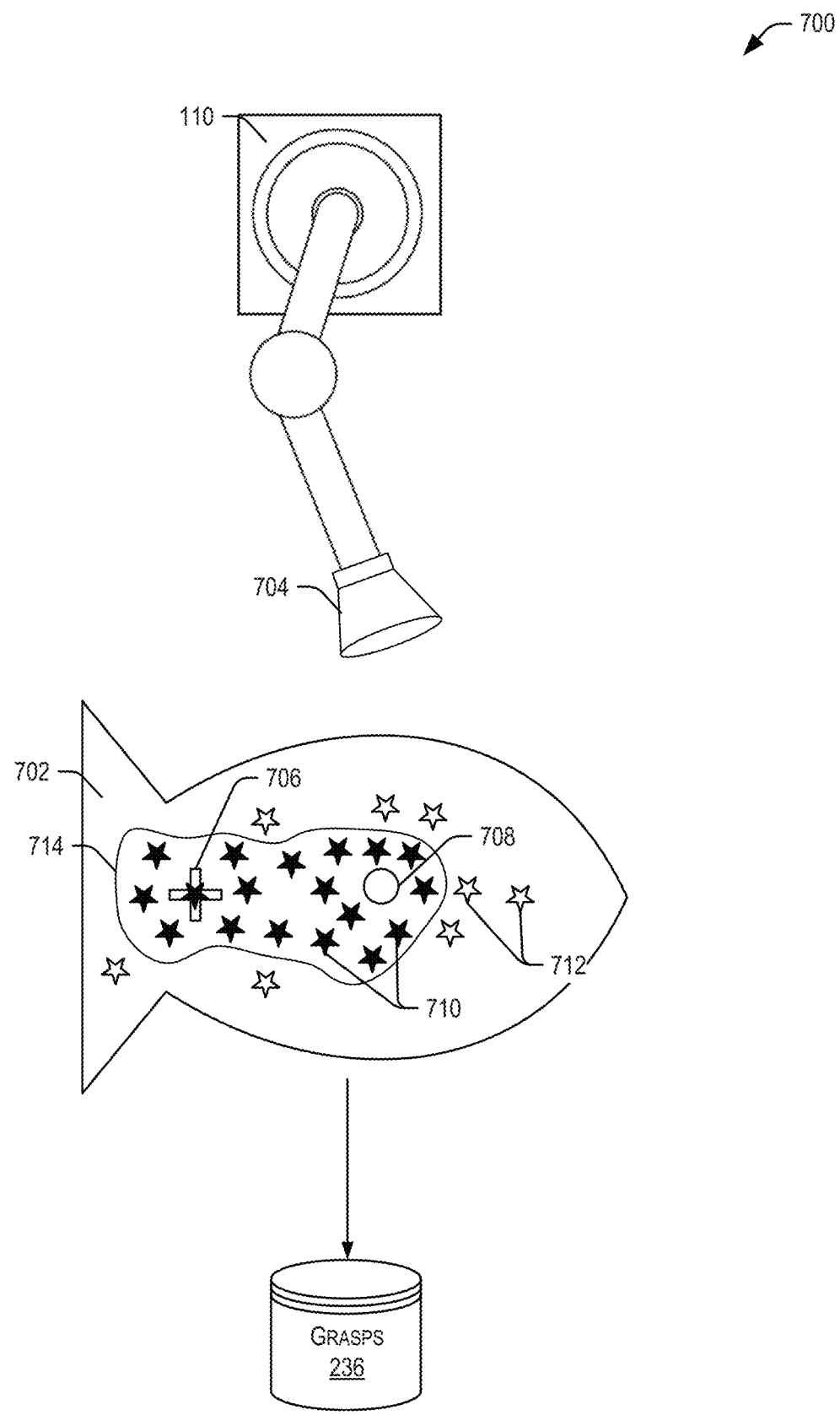
FIG. 7 is a diagram depicting techniques relating to validating grasp sets for robotic manipulators as described herein, according to at least one example.

FIG. 7 illustrates a diagram 700 that depicts an item 702 and the robotic manipulator 110. The robotic manipulator 702, in this example, may include a suction end of arm tool 704. The robotic manipulator 110 may operate in connection with or under management of the grasp management service 102 to attempt to pick up the item 702 using a set of grasps. Thus, the diagram 700 may be representative of a process for validating the set of grasps for the item 702. The item 702 may have a center of mass 706 represented by a cross. Using techniques described herein, other contact points may be automatically determined that result in a better grasp than the taught grasp. In some examples, a human operator may have previously taught the robotic manipulator 110 to pick up the item 702 at a taught location 708. The taught location 708 may have been seemingly reasonable to the human because it is in the center of the item 702. In some examples, the taught grasp may been taught in simulation or in an actual environment. In any event, the grasp management service 102 may use information about the taught grasp to attempt multiple other grasps 710 and 712. Grasps that were capable of successful execution may be indicated as solid filled-in stars 710. Those grasps 710 may be considered feasible grasps. Grasps that were not capable of successful execution may be indicated as hollow stars 712. Those grasps 712 may be considered infeasible grasps and may be excluded from future grasp sets. Information about the attempted grasps 710 and/or 712 may be stored in the grasp database 236. In some examples, the attempted grasps that were feasible 710 may define a success surface 714. The success surface 714 may include each of the feasible grasps 710 and may correspond to a richness measure for the set of grasps. In some examples, a quality value of each of the feasible grasps 710 may be determined. The quality value may be a numerical value based at least in part on one or more objective factors. In some examples, the quality value may be used to rank feasible grasps 710 in a grasp set based on quality. For example, certain grasps that are nearer the center of mass 706 may have higher quality values than other grasps that are further from the center of mass 706. In some examples, the quality value of a grasp may depend on the grasping function, known or determinable characteristics of the item 702 (e.g., surface properties, dimensions, weight, etc.), sensing information received from one or more sensors disposed in the robotic manipulator 110, and any other suitable information. In some examples, a quality threshold may be established for an item, set of items, an end of arm tool, or a set of grasps. The quality threshold may be used to eliminate certain feasible grasps 710 from the set of feasible grasps 710 to create a subset of feasible grasps 710 that may have an even higher probability of success than the feasible grasps 710 that were eliminated. In some examples, the one or more objective factors that make up the quality value may have various weights assigned. In this manner, certain factors may affect the quality value more than others.

Figure 8:
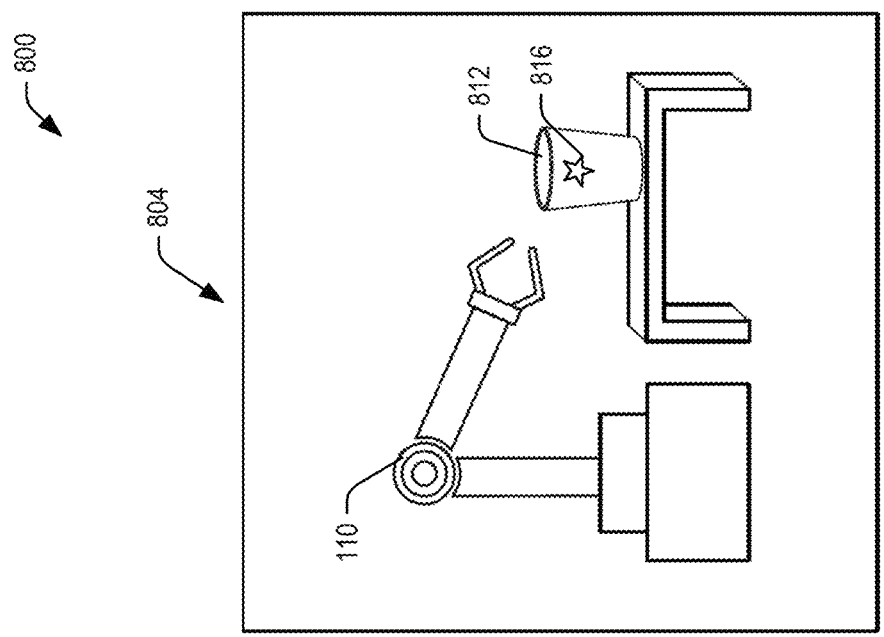
FIG. 8 is a diagram depicting an example environment for implementing techniques relating to generating grasp sets for robotic manipulators as described herein, according to at least one example.
Figure 8:
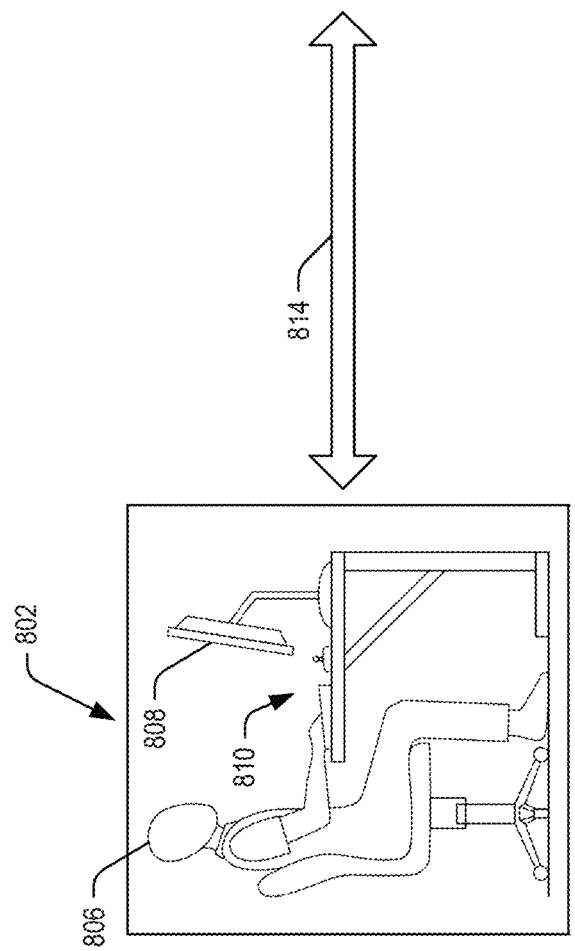

FIG. 8 illustrates an environment 800 including an operator station 802 and a grasping station 804. Generally, the operator station 802 may be in communication via a communication network 814 with the grasping station 804 such that an operator 806 of the operator station 802, who may be remote from the grasping station 804, may control aspects of the robotic manipulator 110. The operator 806 is an example of the user 210 and the operator station 802 may include the user device 204. In some examples, this may be possible via a graphical user interface that enables the operator 806 to view and control in real-time the robotic manipulator 110. The grasp management service 102 may be capable of providing such an interface. Using the interface, the operator 806 may view on an output device 808 (e.g., a display device) aspects of the grasping station 804. For example, the output device 808 may display a streaming video feed of the grasping station 804. Such streaming may enable the operator 806 to use input devices 810 (e.g., keyboard, joystick, touchscreen display on the output device 808, etc.) to tele-operate the robotic manipulator 110 and identify items. In some examples, the graphical user interface enables a display of a generated representation of the grasping station 804. For example, using the graphical user interface, the operator 806 may select, from a three-dimensional model representative of an item 812, one or more graspable surfaces on the item 812 (e.g., an outside surface and an inside surface). Using these graspable surfaces, a grasp may be generated. In some examples, the operator 806 may select the graspable surfaces and a possible grasp from a list of grasps. The robotic manipulator 110 may then attempt to grasp the item 812 using the selected grasping surfaces and grasp. In some examples, the operator 806 may directly instruct the robotic manipulator 110 how to pick up the item 812 by controlling the movements of the robotic manipulator 110. In some examples, the operator 806 or other human user may place a fiducial 816 on the item 812 at a location where the robotic manipulator 110 should pick up the item 812. The fiducial 816 may be a sticker or other suitable device capable of being affixed to the item 812. With the use of fiducial 816, the robotic manipulator 110 may function to automatically learn a grasp by navigating the end of arm tool to pick up the item 812 at the location of the fiducial 816. The fiducial 816 may include any suitable combination of colors, patterns, or machine-readable or human-readable code that can be identified by the robotic manipulator 110. The aforementioned examples may be considered teaching acts, and the information associated therewith can be saved and used to generate other grasps and validate grasps, as described herein.

In some examples, the grasping station 804 may operate without communicating with the operator station 802. For example, the robotic manipulator 110 may function autonomously or semi-autonomously to test a set of predictably successful grasps to determine whether the set is feasible. This may include the robotic manipulator 110 iteratively attempting to pick up the item 812. The robotic manipulator 110 may change its grasping orientation with respect to the item 812 and again iteratively attempt to pick up the item 812. The robotic manipulator may change the orientation of the item 812 and iteratively attempt to pick up the item 812. The success rates for each iteration may be recorded and used to improve the set of predictably successful grasps. In some examples, if the robotic manipulator 110 is unable to find any suitable feasible grasps, a notification may be generated. The generated notification may be provided to the operator 806 via any suitable device (e.g., the user device 204). The operator 806 may then connect to the robotic manipulator 110 and teach it how to pick up the item 812.

Figure 9:
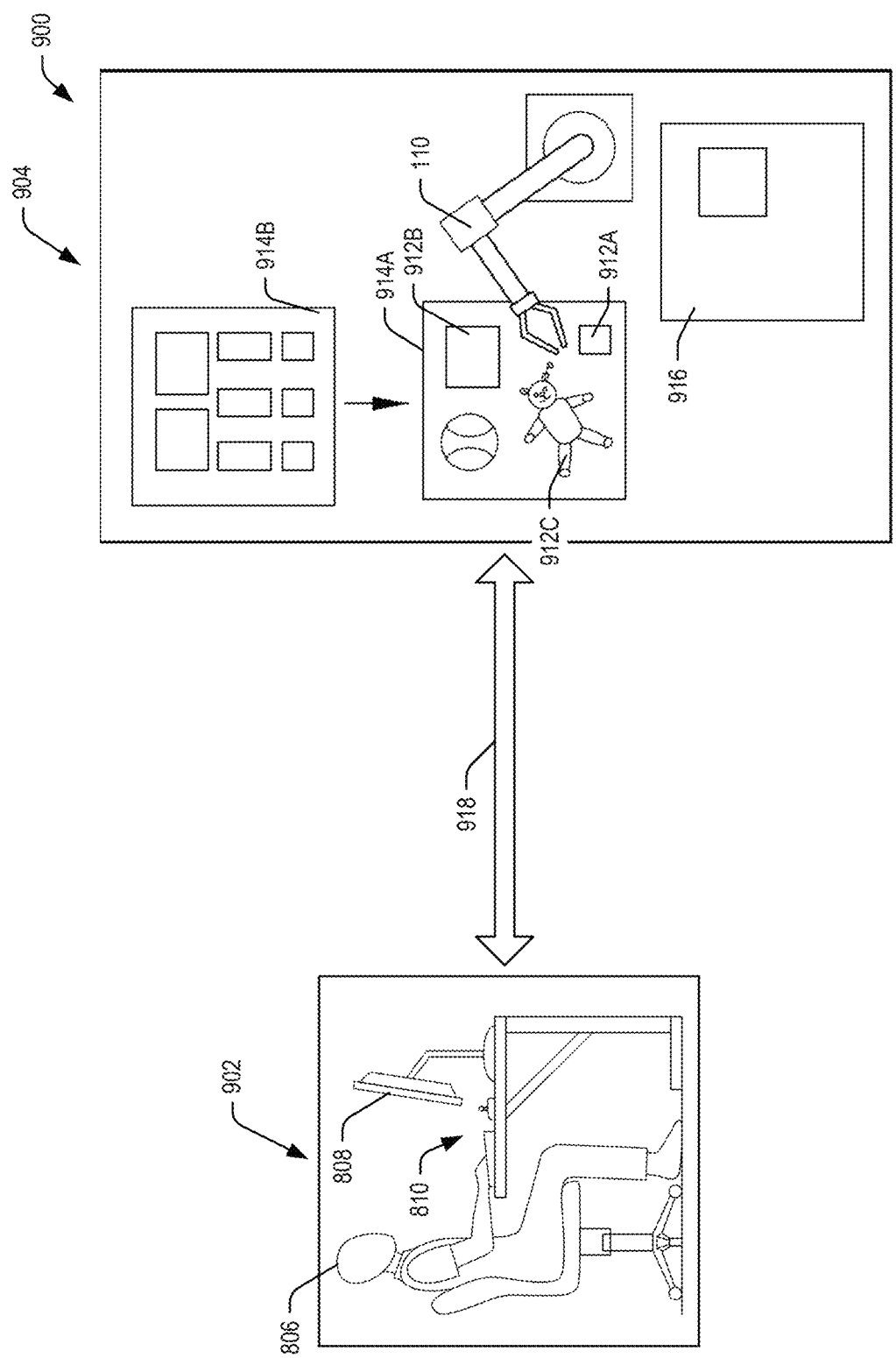
FIG. 9 is a diagram depicting an example environment for implementing techniques relating to generating grasp sets for robotic manipulators as described herein, according to at least one example.

FIG. 9 illustrates an environment 900 including an operator station 902 and a grasping station 904. The operator station 902 is an example of the operator station 802 and therefore also may include an operator 806, an output device 808, and input devices 810. Generally, the operator station 902 may be in communication via a communication network 918 with the grasping station 904 such that the operator 806 of the operator station 902, who may be remote from the grasping station 904, may control aspects of the robotic manipulator 110. As described with reference to FIG. 8, this may be achieved via a graphical user interface. The grasping station 904 may be a live grasping station. In other words, the robotic manipulator 110 may be operating to pick, move and place items 912 between bins 914 and a pallet 916 under actual operating conditions. For example, the bins 914 may be full of inventory items and the robotic manipulator 110 may be using its sensors to identify certain ones of the inventory items to pick up out of the bins 914 as the bins 914 are moved into place before the robotic manipulator 110. If the robotic manipulator 110 is unable to determine a feasible grasp for picking up one of the items (e.g., item 912C), the operator 806 may be notified and connect to the robotic manipulator 110 and cause the robotic manipulator to grasp the item 912C, move other items 912A and 912B using the robotic manipulator 110 that may be occluding the vision of the robotic manipulator 110, and perform any other suitable technique to increase the probability of a successful grasp. In some examples, the operator 806 may function to assist the robotic manipulator 110 with item identification. For example, the robotic manipulator 110 may not be able to identify a required item from the bin 914A. In response, a list of items corresponding to those in the bin 914A together with images of the items may be presented on the output device 808 at the operator station 902. In addition, an image of the bin 914A, perhaps from the perspective of the robotic manipulator 110, may be presented on the output device 808. Based on this information, the operator 806 may identify the required item and cause the robotic manipulator to pick up the required item.

Figure 10:
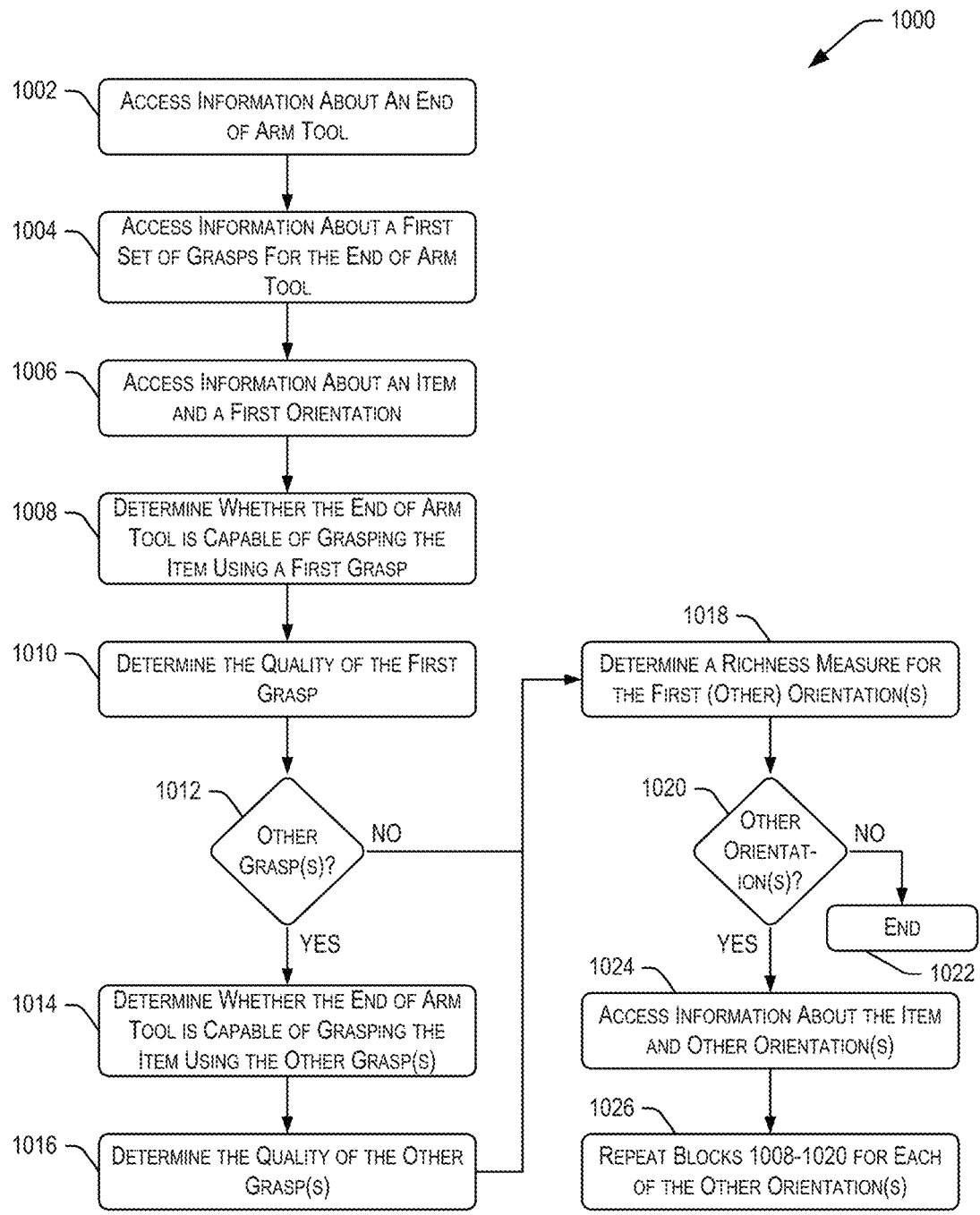
FIG. 10 is a flow diagram depicting example acts for implementing techniques relating to validating grasp sets for robotic manipulators as described herein, according to at least one example.
Figure 11:
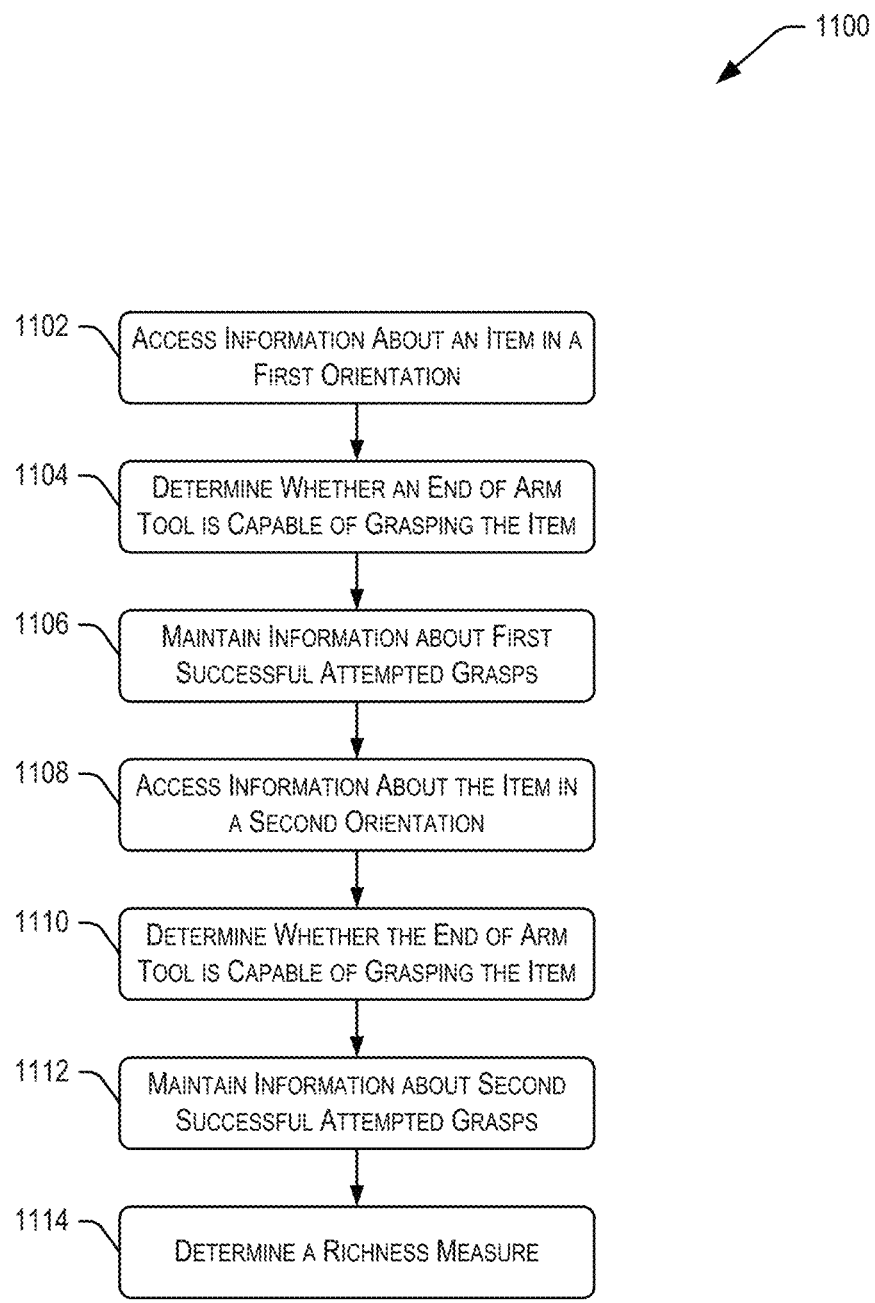
FIG. 11 is a flow diagram depicting example acts for implementing techniques relating to validating grasp sets for robotic manipulators as described herein, according to at least one example.
Figure 12:
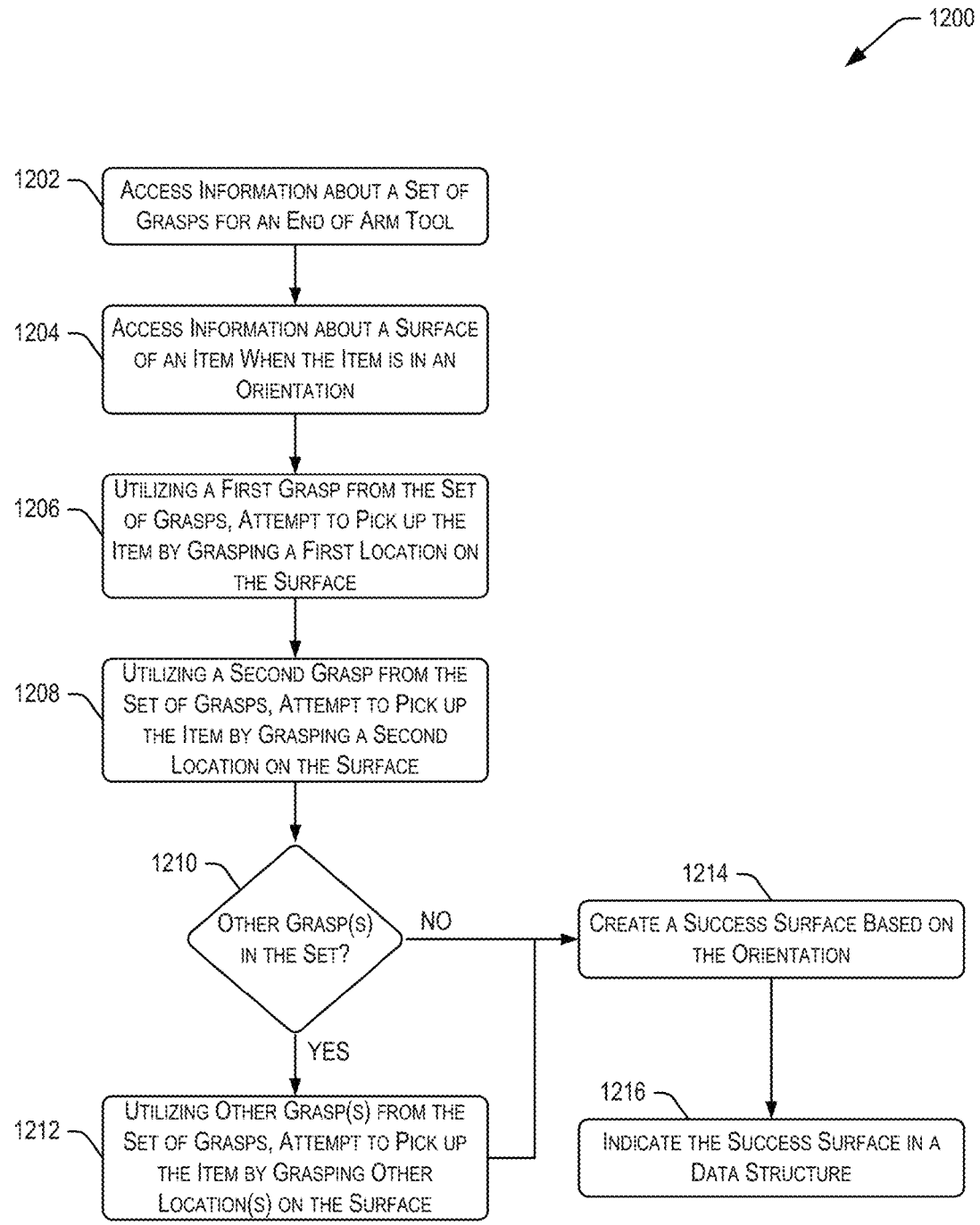
FIG. 12 is a flow diagram depicting example acts for implementing techniques relating to validating grasp sets for robotic manipulators as described herein, according to at least one example.

FIGS. 10-12 illustrate example flow diagrams showing respective processes 1000, 1100, and 1200 as described herein. These processes 1000, 1100, and 1200 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 10 depicts the process 1000 including example acts or techniques relating to determining a richness measure as it relates to validating grasp sets, as described herein. The grasp management engine 220 (FIG. 2) may perform the process 1000 of FIG. 10. The process 1000 begins at 1002 by accessing information about an end of arm tool. This may be performed by the arm tool module 308 (FIG. 3). The end of arm tool may be connected to a robotic manipulator and include a grasping function capable of grasping an item.

At 1004, the process 1000 accesses information about a first set of grasps for the end of arm tool. This may be performed by the grasp generation module 310 (FIG. 3). The first set of grasps may have been previously generated in accordance with any suitable grasp generation technique. In some examples, the first set of grasps were generated in response to input from a human operating the robotic manipulator to teach the robotic manipulator to pick up the item or in response to placement of a fiducial marker on the item. The grasps may also have been automatically generated. Thus, the first set of grasps may include at least one taught grasp and at least one successful grasp that was attempted by the robotic manipulator without input from the human.

At 1006, the process 1000 access information about an item and a first orientation. This may be performed by the item identification module 302 (FIG. 3). The item may be any suitable item capable of manipulation by the robotic manipulator. The first orientation may be a first item orientation or an orientation of the item with respect to the robotic manipulator. In some examples, the first orientation may be a first grasping orientation or an orientation of the robotic manipulator with respect to the item. The information may be accessed from a database that stores orientations, from a simulation environment, or streaming from an actual environment.

At 1008, the process 1000 determines whether the end of arm tool is capable of grasping the item using a first grasp. This may be performed by the validation module 312 (FIG. 3). Determining whether the end of arm tool is capable of grasping the item may include receiving information from the simulation environment or from the actual environment indicating whether the end of arm tool, using the grasping function at a first set of contact points located on the item, was able to successfully pick up the item. The first grasp may be a first grasp from the set of grasps and may be associated with the first set of contact points. Whether in the simulation environment or the actual environment, multiple attempts with the first grasp may be performed and success rates may be recorded.

At 1010, the process 1000 determines a quality value of the first grasp. This may be performed by the validation module 312. The quality value of the first grasp may be determined based at least in part on sensing information and other feedback based on the attempts made in the simulation environment or the actual environment. In some examples, the quality value of the first grasp may be represented as a numerical quality value that can be used to compare the quality of the first grasp with other grasps. For example, various aspects of quality may be assigned weighted values that can be summed or otherwise combined to compute the numerical quality value. Example aspects may include slippage of the item with respect to the end of arm tool, power used by the robotic manipulator to execute the first grasp, computing resources used to determine and execute the first grasp, time taken to execute the first grasp, and any other suitable factor.

At 1012, the process 1000 determines whether other grasps exist. This may be performed by the validation module 312. Determining whether the other grasps exist may depend, at least in part, on whether the set of grasps includes other predictably successful grasps. If "YES," the process 1000 proceeds to 1014. At 1014, the process 1000 determines whether the end of arm tool is capable of grasping the item using the other grasps. This may be performed by the validation module 312 in a manner similar to act 1008. At 1016, the process 1000 determines the quality value of the other grasps. This may be performed by the validation module 312 in a manner similar to act 1010.

From 1016 and if the answer at 1012 is "NO," the process 1000 proceeds to 1018. At 1018, the process 1000 determines a richness measure for the first orientation and (when applicable) the other orientation(s). This may be performed by the validation module 312. For the first orientation, the richness measure may represent a spatial variation of grasps of the set of grasps with respect to the first orientation. In some examples, the richness measure may be determined based at least in part on the determinations made at 1008 and 1010 for the first grasp and at 1014 and 1016 for other grasps on the item. For example, the richness measure may be based on the number of feasible grasps in the first orientation on the item and the quality values of those grasps.

At 1020, the process 1000 determines whether other orientation(s) exist. This may be performed by the validation module 312. The other orientations may be other item orientations and/or other grasping orientations. In some examples, the process 1000 may be performed for the grasps in the grasp set that correspond to each item orientation and each grasping orientation. Information associated with this process may be used to determine the richness measure(s) at 1018. If the answer at 1020 is "NO," the process 1000 ends at 1022. If the answer at 1022 is "YES," the process 1000 proceeds to 1024. At 1024, the process 1000 accesses information about the item in other orientation(s). This may be performed by the item identification module 302 and in a manner similar to act 1006. Thus, the other orientation(s) may include item orientations and/or grasping orientations. At 1026, the process 1000 repeats blocks 1008-1020 for each of the other orientation(s).

FIG. 11 depicts the process 1100 including example acts or techniques relating to determining a richness measure as it relates to validating grasp sets, as described herein. The grasp management engine 220 (FIG. 2) may perform the process 1100 of FIG. 11. The process 1100 begins at 1102 by accessing information about an item in a first orientation. This may be performed by the item identification module 302 (FIG. 3). The first orientation may be a first item orientation with respect to an end of arm tool of a robotic manipulator. The end of arm tool may include a grasping function capable of grasping the item. The information may be sensing information, database information, and any other suitable information.

At 1104, the process 1100 determines whether the end of arm tool is capable of grasping the item. This may performed by the validation module 312 (FIG. 3). Determining whether the end of arm tool is capable of grasping the item may include determining whether the end of arm tool is capable of grasping the item at any of a plurality of contact points located on the item using the grasping function when the item is in the first orientation. This determining may include iteratively for each contact point of the plurality of contact points, instructing the robotic manipulator to grasp the item at each contact point and recording in a data structure success or failure of the grasps. In some examples, the robotic manipulator may execute in a simulation environment and/or an actual environment.

At 1106, the process 1100 maintains information about first successful attempted grasps. This may be performed by the validation module 312. The information may be maintained in a database associated with the grasp management service 102. The first successful grasps may correspond to validated grasps when the item is in the first orientation.

At 1108, the process 1100 accesses information about the item in a second orientation. This may be performed by the item identification module 302 in a manner similar to act 1102.

At 1110, the process determines whether the end of arm tool is capable of grasping the item. This may performed by the validation module 312 in a manner similar to act 1104. Determining whether the end of arm tool is capable of grasping the item may include determining whether the end of arm tool is capable of grasping the item at any of a plurality of contact points located on the item using the grasping function when the item is in the second orientation. This determining may include iteratively for each contact point of the plurality of contact points, instructing the robotic manipulator to grasp the item at each contact point and recording in a data structure success or failure of the grasps. In some examples, the robotic manipulator may execute in a simulation environment and/or an actual environment.

At 1112, the process 1100 maintains information about second successful attempted grasps. This may be performed by the validation module 312 in a manner similar to act 1106.

At 1114, the process 1100 determines a richness measure. This may be performed by the validation module 312. In some examples, determining the richness measure may include a first richness measure for the first orientation and a second richness measure for the second orientation. The richness measures may be determined based at least in part on a spatial variation of successful attempted grasps in the respective orientations. In some examples, at least a portion of the process 1100 may be repeated iteratively for different item orientations and different grasping orientations.

FIG. 12 depicts the process 1200 including example acts or techniques relating to determining a success surface as it relates to validating grasp sets, as described herein. The grasp management engine 220 (FIG. 2) may perform the process 1200 of FIG. 12. The process 1200 begins at 1202 by accessing information about a set of grasps for an end of arm tool. This may be performed by the grasp generation module 310 (FIG. 3). The set of grasps may be for the end of arm tool to grasp an item. In some examples, the set of grasps may include at least one taught grasp.

At 1204, the process 1200 accesses information about a surface of an item when the item is in an orientation. This may be performed by the validation module 312 (FIG. 3). The surface may be a surface on which the item is capable of being grasped. For example, the surface may be a top surface. In some examples, the surface is composed of more than one surface. The orientation may be an item orientation.

At 1206, the process 1200, utilizing a first grasp from the set of grasps, attempts to pick up the item by grasping a first location on the surface. This may be performed by the validation module 312. The grasping may be performed by the end of arm tool. In some examples, the attempt may be made in a simulation or an actual environment. The orientation may correspond to a stable orientation or an orientation in which the item has limited movement. In some examples, the first location may correspond to one or more contact points on the surface of the item.

At 1208, the process 1200, utilizing a second grasp from the set of grasps, attempts to pick up the item by grasping a second location on the surface. This may be performed by the validation module 312. The grasping may be performed by the end of arm tool. In some examples, the attempt may be made in a simulation or an actual environment. The orientation may correspond to a stable orientation or an orientation in which the item has limited movement. In some examples, the second location may correspond to one or more contact points on the surface of the item.

At 1210, the process 1200 determines whether other grasp(s) exist in the set. This may be performed by the validation module 312. In some examples, the set of grasps may include more than the two grasps attempted previously. If "YES," then at 1212, the process 1200, utilizing other grasp(s) from the set of grasps, attempts to pick up the item by grasping other location(s) on the surface. This may be performed by the validation module 312 in a manner similar to acts 1206 and 1208.

If the answer at 1210 is "NO," the process 1200 proceeds to 1214. At 1214, the process 1200 creates a success surface based on the orientation. This may be performed by the validation module 312. The success surface may be determined based at least in part on the results of the attempts at 1206, 1208, and, in some examples, 1212. The success surface may correspond to a richness measure for the set of grasps with respect to the surface. For example, the surface may be a top surface of an item, and the success surface may be a smaller surface within the top surface that includes each of the set of grasps that were successfully attempted. In some examples, the success surface may define a spatial variation between the first location and the second location and/or any other locations that resulted in successful grasps.

At 1216, the process 1200 indicates or records the success surface in a data structure. This may be performed by the validation module 312.

Figure 13:
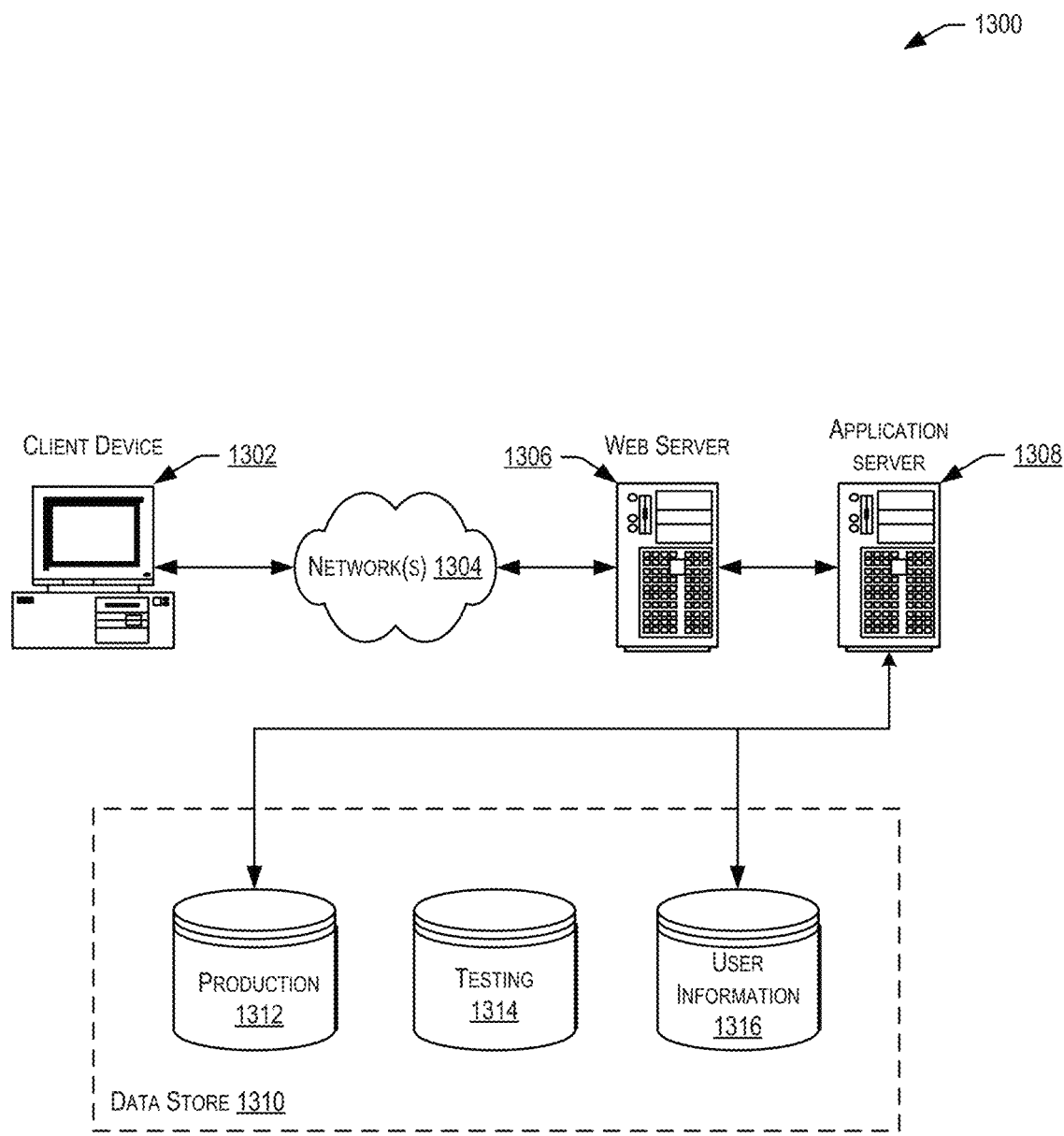
FIG. 13 is an example schematic environment for implementing techniques relating to generating and validating grasp sets for robotic manipulators as described herein, according to at least one example.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A system, comprising:
at least one processor; and
a memory including instructions that, when executed by the at least one processor cause the system to, at least:
 access information about an item;
 access information about an end of arm tool of a robotic manipulator comprising a grasping function capable of grasping the item; and
 determine a richness measure for multiple orientations of the item for a set of grasps for use by the end of arm tool, each of the grasps comprising utilization of the grasping function to successfully grasp the item via one or more contact points on the item, the richness measure representing a spatial variation of grasps of the set of grasps with respect to each orientation of the item, the richness measure for each orientation determined by at least:

determining whether the end of arm tool is capable of grasping the item using the grasping function at a first set of contact points located on the item when the item is in the orientation with respect to the end of arm tool;

determining a quality value of the grasp at the first set of contact points;

iteratively determining additional sets of contacts points in the orientation at which the end of arm tool is capable of grasping the item using the grasping function, and quality values of grasps at the additional sets of contact points; and determining the richness measure for the orientation based at least in part upon the number of grasps in the orientation and the quality values of the grasps.

2. The system of claim 1, wherein the set of grasps comprises:

at least one successful learned grasp that was attempted in response to input from a human operating the robotic manipulator; and at least one successful grasp that was attempted by the robotic manipulator without input from the human.

3. The system of claim 1, wherein determining whether the end of arm tool is capable of grasping the item using the grasping function comprises:

simulating, in a simulation environment, multiple attempts to grasp a simulated item using a simulated end of arm tool;

recording, in a data structure associated with the simulation environment and for each of the multiple attempts, whether the simulated end of arm tool successfully grasped the simulated item; and determining, based at least in part on information in the data structure, a rate of success for each simulated grasp of the set of grasps.

4. The system of claim 1, wherein determining whether the end of arm tool is capable of grasping the item using the grasping function comprises:

attempting, in a testing environment, multiple attempts to grasp the item using the end of arm tool;

recording, in a data structure associated with the testing environment and for each of the multiple attempts, whether the end of arm tool successfully grasped the item; and determining, based at least in part on information in the data structure, a rate of success for each grasp of the set of grasps.

5. The system of claim 1, wherein determining the quality value of the grasp at the first set of contact points is based at least in part on sensing information received from one or more sensors associated with at least one of the end of arm tool or the robotic manipulator.

6. A computer-implemented method, comprising:

accessing information about an item in a first item orientation relative to an end of arm tool of a robotic manipulator comprising a grasping function;

determining whether the end of arm tool is capable of grasping the item at any of a plurality of contact points located on the item using the grasping function when the item is in the first orientation;

maintaining information about first successful attempted grasps that represent that the end of arm tool successfully grasped the item in the first orientation;

accessing information about the item in a second item orientation relative to the end of arm tool of the robotic manipulator;

determining whether the end of arm tool is capable of grasping the item at any of the plurality of contact points located on the item using the grasping function when the item is in the second item orientation;

maintaining information about second successful attempted grasps that represent that the end of arm tool successfully grasped the item in the second orientation; and determining a richness measure for each of the first orientation and the second orientation based upon a spatial variation of successful attempted grasps in the respective orientation.

7. The computer-implemented method of claim 6, wherein the first successful attempted grasps comprise a successful learned grasp that was attempted in response to input from a human operating the robotic manipulator.

8. The computer-implemented method of claim 6, wherein the first item orientation comprises the item oriented with a side facing up and the second item orientation comprises the item oriented with the side facing down.

9. The computer-implemented method of claim 6, wherein a bottom side of the item rests on a surface in the first item orientation, and the item is rotated about an axis extending about normal to the surface in the second item orientation.

10. The computer-implemented method of claim 6, wherein determining whether the end of arm tool is capable of grasping the item when the item is in the first orientation comprises, iteratively, for each contact point of the plurality of contact points:

instructing the robotic manipulator to cause the end of arm tool to pick up the item at each contact point of the plurality of contact points; and recording in a data structure success or failure of the end of arm tool to pick up the item at each contact point of the plurality of contact points.

11. The computer-implemented method of claim 6, wherein the first successful attempted grasps and the second successful attempted grasps define a set of successful attempted grasps.

12. The computer-implemented method of claim 11, wherein the richness measure for each of the first orientation and the second orientation comprises first and second richness measures, the method further comprising:

expanding the set of successful attempted grasps to form an expanded set of successful attempted grasps by at least:

determining whether the end of arm tool is capable of grasping the item at any of the plurality of contact points located on the item using the grasping function when the end of arm tool is in a first grasping orientation relative to the item;

maintaining information about third successful attempted grasps that represent that the end of arm tool successfully grasped the item when the end of arm tool is in the first grasping orientation;

accessing information about the end of arm tool being in a second grasping orientation relative to the item;

determining whether the end of arm tool is capable of grasping the item at any of the plurality of contact points located on the item using the grasping function when the end of arm tool is in the second grasping orientation;

maintaining information about fourth successful attempted grasps that represent that the end of arm tool successfully grasped the item when the end of arm tool is in the second grasping orientation; and determining third and fourth richness measures for each of the first grasping orientation and the second grasping orientation based upon a spatial variation of successful attempted grasps in the respective grasping orientation; and determining, based on the first and second richness measures and the third and fourth richness measures, an overall richness measure corresponding to the expanded set of successful attempted grasps.

13. The computer-implemented method of claim 12, wherein the first grasping orientation comprises the end of arm tool approaching the item at an upper portion of the item, and the second grasping orientation comprises the end of arm tool approaching the item from a side portion of the item.

14. The computer-implemented method of claim 6, wherein at least one contact point of the plurality of contact points corresponds to a fiducial marker indicating a suggested grasping location for the end of arm tool to grasp the item.

15. The computer-implemented method of claim 6, wherein determining the richness measure for each of the first orientation and the second orientation is further based upon the spatial variation of successful attempted grasps as compared to a surface area of the item.

16. A computer-implemented method, comprising:
accessing information about a set of grasps for an end of arm tool of a robotic manipulator to grasp an item;
accessing information about a surface of the item when the item is in an orientation; and
creating a success surface area based on the orientation by at least:
when the item is in the orientation, utilizing a first grasp from the set of grasps, successfully picking up the item by grasping a first location on the surface of the item with the end of arm tool;
when the item is in the orientation, utilizing a second grasp from the set of grasps, successfully picking up the item by grasping a second location on the surface of the item with the end of arm tool; and
recording, in a data structure, the success surface area defined by a spatial variation between the first location and the second location.

17. The computer-implemented method of claim 16, wherein the orientation comprises a first stable orientation of the item previously identified as being stable.

18. The computer-implemented method of claim 16, wherein the success surface area is determined when the end of arm tool is in a first grasping orientation with respect to the item, the method further comprising:
accessing information indicating that the end of arm tool is in a second grasping orientation with respect to the item;
utilizing the first grasp from the set of grasps, successfully picking up the item by grasping the item at the first location when the end of arm tool is in the second grasping orientation;
utilizing the second grasp from the set of grasps, successfully picking up the item by grasping the item at the second location when the end of arm tool is in the second grasping orientation; and
updating the success surface area based at least in part on the end of arm tool successfully picking up the item at the first and second locations in the second grasping orientation.

19. The computer-implemented method of claim 16, wherein creating the success surface area comprises iteratively, utilizing each grasp from the set of grasps, successfully picking up the item by grasping various locations on the surface of the item with the end of arm tool, the success surface area defined by a spatial variation among the first location, the second location, and the various locations.

20. The computer-implemented method of claim 16, wherein in response to the success surface area failing to meet a threshold value, the method further comprising generating a notification that at least indicates the set of grasps as being incomplete.

* * * * *